(12) United States Patent
Iizuka

(10) Patent No.: US 8,019,904 B2
(45) Date of Patent: Sep. 13, 2011

(54) IMAGE PROCESSING DEVICE AND CONTROL METHOD THEREOF

(75) Inventor: Toshiaki Iizuka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 11/954,180

(22) Filed: Dec. 11, 2007

(65) Prior Publication Data

US 2008/0147900 A1    Jun. 19, 2008

(30) Foreign Application Priority Data

Dec. 18, 2006 (JP) ................. 2006-339861

(51) Int. Cl.
*G06F 3/00* (2006.01)
*G06F 13/00* (2006.01)

(52) U.S. Cl. ............... 710/8; 710/72; 710/104

(58) Field of Classification Search ............. 710/72, 710/8, 104
See application file for complete search history.

(56) References Cited

U.S. PATENT DOCUMENTS

| | | | | |
|---|---|---|---|---|
| 6,314,088 B1 * | 11/2001 | Yamano | ................. | 370/254 |
| 2004/0120001 A1 * | 6/2004 | Boldon | ................. | 358/1.15 |
| 2005/0027807 A1 * | 2/2005 | Fengler et al. | ................. | 709/206 |
| 2005/0158100 A1 * | 7/2005 | Yamaguchi et al. | ............. | 400/62 |
| 2007/0055970 A1 * | 3/2007 | Sakuda et al. | ................. | 717/168 |

FOREIGN PATENT DOCUMENTS

JP    2006-235957    9/2006

* cited by examiner

*Primary Examiner* — Alford W Kindred
*Assistant Examiner* — Farley Abad
(74) *Attorney, Agent, or Firm* — Fitzpatrick, Cella, Harper & Scinto

(57) ABSTRACT

An image processing device, which can communicate with a distributor distributing setting information to plural image processors, comprises: a first receiver to receive, from the distributor, start information indicating that the distributor starts distributing the setting information to the plural image processors including the image processing device; a second receiver to receive the setting information distributed by the distributor; a detector to detect that the image processing device is operated by a user; and a controller to, in a case where it is detected by the detector that the image processing device is operated, request the distributor to distribute the setting information if the start information is received and the setting information is not received, and execute a process based on the operation detected by the detector if the start information is not received or the setting information is received.

7 Claims, 23 Drawing Sheets

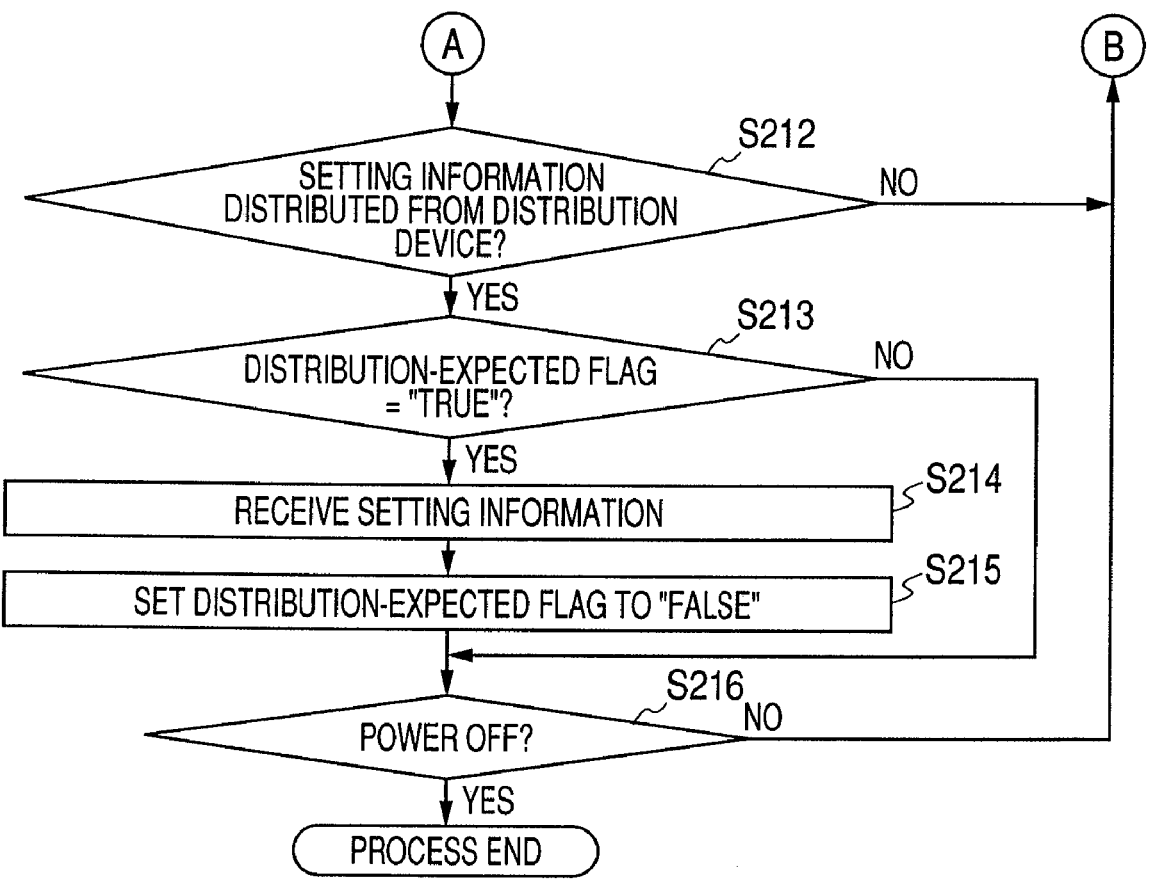

FIG. 12

| | SETTING 1 | SETTING 2 | SETTING 3 | SETTING 4 | SETTING 5 | SETTING 6 | SETTING 7 |
|---|---|---|---|---|---|---|---|
| FUNCTION 1 | ON | OFF | ON | ON | ON | ON | ON |
| FUNCTION 2 | ON | ON | OFF | ON | OFF | ON | OFF |
| FUNCTION 3 | OFF | ON | ON | OFF | ON | OFF | ON |
| FUNCTION 4 | ON | ON | OFF | ON | ON | ON | ON |
| FUNCTION 5 | OFF | OFF | ON | ON | OFF | ON | OFF |
| FUNCTION 6 | OFF | ON | ON | ON | OFF | ON | OFF |
| FUNCTION 7 | ON | ON | OFF | ON | OFF | ON | OFF |
| FUNCTION 8 | ON | ON | OFF | ON | ON | ON | ON |
| FUNCTION 9 | ON | ON | OFF | ON | OFF | ON | OFF |
| FUNCTION 10 | OFF | ON | ON | OFF | ON | OFF | ON |
| FUNCTION 11 | ON | ON | OFF | ON | ON | ON | ON |
| FUNCTION 12 | OFF | OFF | ON | ON | OFF | ON | OFF |
| FUNCTION 13 | OFF | ON | ON | ON | ON | ON | ON |
| FUNCTION 14 | ON | ON | OFF | ON | OFF | ON | OFF |
| FUNCTION 15 | ON | ON | OFF | OFF | ON | ON | OFF |
| FUNCTION 16 | ON | ON | OFF | ON | ON | ON | OFF |
| FUNCTION 17 | OFF | ON | ON | ON | OFF | ON | ON |
| FUNCTION 18 | ON | ON | OFF | ON | OFF | ON | OFF |
| FUNCTION 19 | OFF | OFF | ON | ON | OFF | OFF | ON |
| FUNCTION 20 | OFF | ON | ON | ON | ON | ON | OFF |
| FUNCTION 21 | ON | ON | OFF | ON | OFF | OFF | ON |
| FUNCTION 22 | ON | ON | OFF | OFF | ON | ON | ON |
| FUNCTION 23 | ON | ON | OFF | ON | ON | ON | OFF |
| FUNCTION 24 | ON | ON | OFF | ON | OFF | ON | OFF |

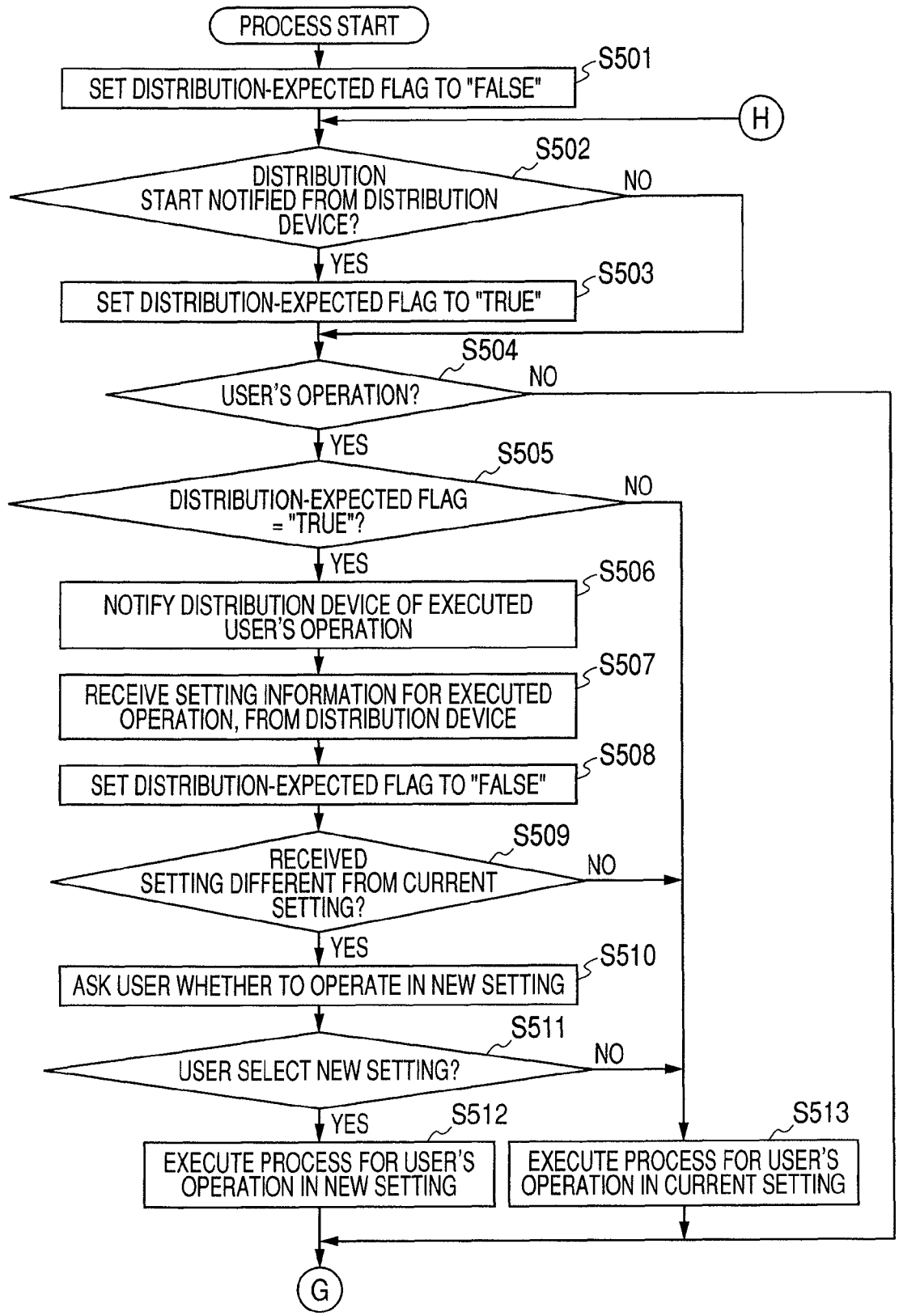

IMAGE PROCESSING DEVICE AND CONTROL METHOD THEREOF

BACKGROUND OF THE INVENTION

1. Field of the Invention

The present invention relates to an image processing device which can communicate with a distribution device which distributes setting information to plural image processing devices, and a control method for controlling the image processing device.

2. Description of the Related Art

In recent years, image processing devices, such as a printer, a multifunction device having a scanner function, a facsimile function and a copying function in addition to a printer function, are frequently connected to a network such as an intra-company LAN (local area network) or the like. Under the circumstances, to concentratedly control settings of the numerous devices mutually connected on the intra-company LAN, one personal computer, one printer or one multifunction device may be used as a controller for controlling the settings. In this connection, a function to distribute setting information manually set in the relevant controller to the numerous devices on the network and to execute settings to these devices based on the distributed setting information is conceivable (Japanese Patent Application Laid-Open No. 2006-235957). For example, to save papers to be used, a procedure "if two originals each having blank back side are read, these originals are surely copied as a single two-sided copy" is conceivable as a setting for paper discharge in the copying function. In this case, it is troublesome to manually execute this setting to all the multifunction devices located in such a relevant office and each having the copying function. In such a case, a user only has to manually execute the setting only to one multifunction device if he/she utilizes the function described in Japanese Patent Application Laid-Open No. 2006-235957. Besides, also in a case where accounting to the number of prints is controlled and managed based on department ID's, the user only has to manually set the department ID's to one printer or one multifunction device. This is because, in such cases, it is possible to distribute and register setting information for paper discharge and setting information for the department ID in the copying function.

As described above, a system, which includes a distribution device having a function to distribute setting information set for own device itself to another image processing device and an image processing device on a reception side (hereinafter, called a reception-side image processing device) receiving the distributed setting information and setting it as setting information for own device itself, is conceivable. In this system, in a case where there are hundreds or thousands of reception-side image processing devices, the following problems occur.

For example, it is assumed that it takes five minutes for distribution of the setting information to one image processing device. Here, in a case where there are 1,000 reception-side image processing devices, if the distribution device executes the distribution to the reception-side image processing devices in sequence, it takes 5,000 minutes until the distribution to all the reception-side image processing devices end. Consequently, it is conceivable that the setting information is distributed to all of the 1,000 reception-side image processing devices in parallel. However, in such a case, network traffic increases, and the operations of other devices using the same LAN are interrupted. Further, since a CPU (central processing unit) load and a memory use amount in the distribution device increase, it is necessary in such parallel distribution to limit the number of parallel processes to some extent.

On the other hand, a user, who uses some reception-side image processing device receiving the distributed setting information, uses in fact the relevant device without feeling interest in the fact that there are 1,000 reception-side image processing devices on the LAN. The user only desires the relevant device to always operate for the user in the latest setting. In other words, when the user actually uses a multifunction device, he/she desires that desired setting has been executed to the relevant device irrespective of a problem how long taking time to distribute the setting information. However, in a case where the setting information is sequentially distributed to the plural reception-side image processing devices, there is a possibility that the user uses the image processing device to which the setting information is not yet distributed. In that case, the user cannot know "the setting information is being distributed now, and the setting information is not yet distributed to the image processing device which is intended to be used by the user". Further, it is difficult for the user to know whether or not the setting information has been distributed to the image processing device which is intended to be used by the user, and whether or not, although the setting information is not yet distributed, the setting will be soon executed to the relevant device. For this reason, there is a problem that, although new setting is not reflected on the image processing device, the user misunderstands that the new setting has been reflected. In that case, there are fears that the user transmits data to an incorrect destination and executes a print process based on incorrect setting.

SUMMARY OF THE INVENTION

The present invention has been completed in consideration of such conventional problems as described above. The present invention aims to provide an image processing device which can surely receive, in a case where a user uses the relevant image processing device, setting information distributed by a distribution device.

According to a first aspect of the present invention, there is provided an image processing device which can communicate with a distribution device distributing setting information to plural image processing devices, comprising: a first reception unit adapted to receive, from the distribution device, start information indicating that the distribution device starts distributing the setting information to the plural image processing devices including the relevant image processing device; a second reception unit adapted to receive the setting information distributed by the distribution device; a detection unit adapted to detect that the relevant image processing device is operated by a user; and a control unit adapted to, in a case where it is detected by the detection unit that the relevant image processing device is operated, request the distribution device to distribute the setting information if the start information is received and the setting information is not received, and execute a process based on the operation detected by the detection unit if the start information is not received or the setting information is received.

According to a second aspect of the present invention, there is provided an image processing device which can communicate with a distribution device distributing setting information to plural image processing devices, comprising: a first reception unit adapted to receive, from the distribution device, start information indicating that the distribution device starts distributing the setting information to the plural image processing devices including the relevant image processing device; a second reception unit adapted to receive the setting information distributed by the distribution device; a detection unit adapted to detect that the relevant image processing device is operated by a user; a determination unit adapted to determine whether or not the start information is received and the setting information is not received, in a case where it is detected by the detection unit that the relevant image processing device is operated; and a request unit adapted to request the distribution device to distribute the setting information in a case where it is determined by the determination unit that the start information is received and the setting information is not received.

Other features, objects and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the exemplary embodiments of the present invention and, together with the description, serve to explain the principles of the present invention.

FIG. 12 is a diagram illustrating an example of a data structure of the setting information distributed by the distribution device.

DESCRIPTION OF THE EMBODIMENTS

Hereinafter, the exemplary embodiments of the present invention will be described with reference to the attached drawings.

Figure 1:
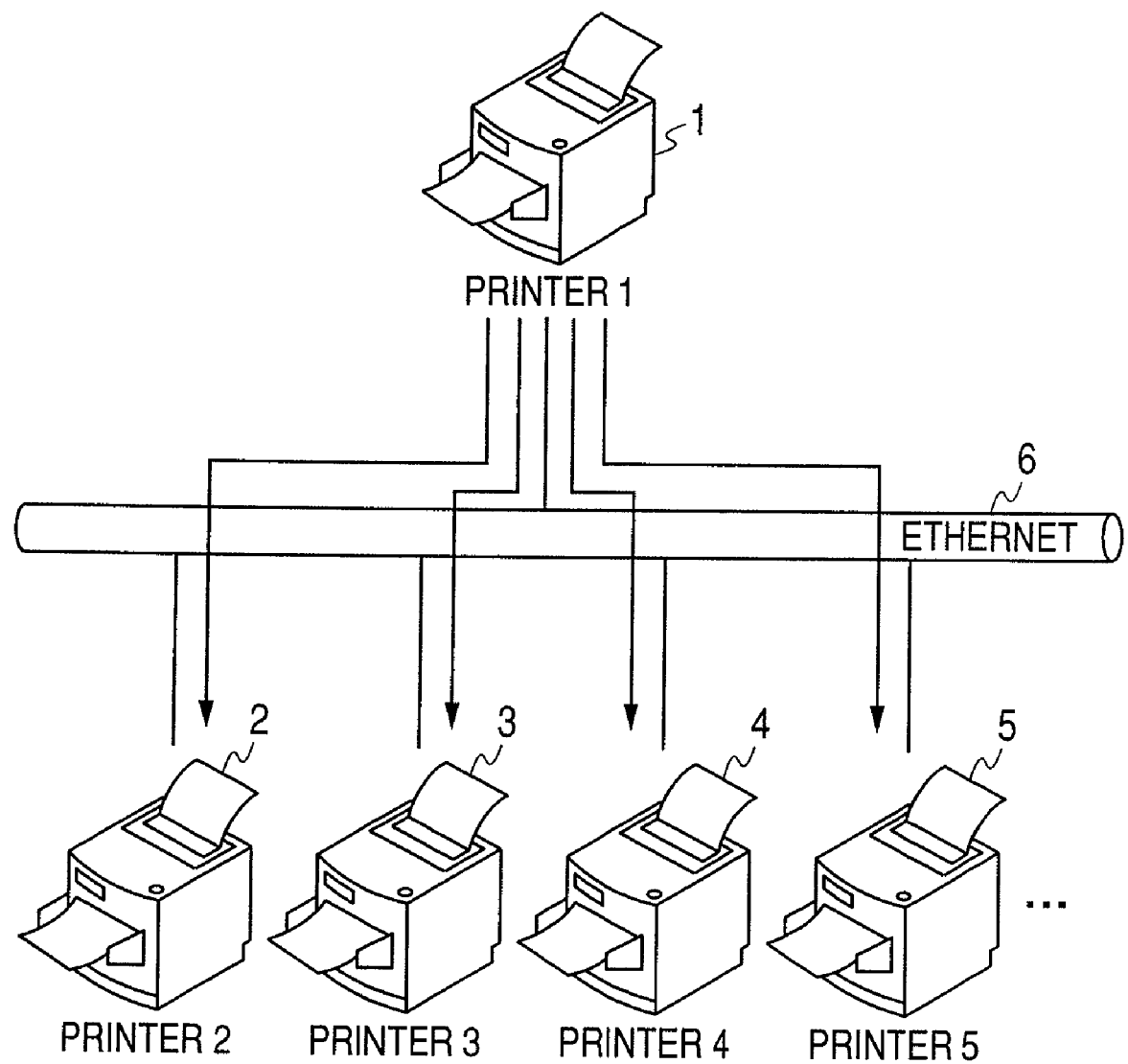
FIG. 1 is a diagram illustrating an example of a system which includes a distribution device and reception-side image processing devices.

FIG. 1 is a diagram illustrating an example of a system which consists of a distribution device which distributes setting information to be set to a device, and image processing devices on a reception side (hereinafter, called reception-side image processing devices) each of which receives the setting information distributed from the distribution device and sets it as the setting information of own device. More specifically, in FIG. 1, a printer 1 acting as the distribution device, and five printers 2 to 5 acting as the reception-side image processing devices are connected to a network (Ethernet™) 6.

If a user instructs to change setting for the printer 1, only the setting for the printer 1 is changed under normal conditions. However, the printer 1 includes a function to distribute setting information distributed to the printer 1 itself to other devices on the network, and each of the printers 2 to 5 includes a function to receive distributed setting information and set the received setting information as its own setting information. Namely, the user can execute to the printers 2 to 5 the setting same as that changed on the printer 1, without directly handling the printers 2 to 5. In other words, the user can execute the same setting to the printers 1 to 5 through a single operation to one of these printers.

In the following, for convenience of description, it is assumed that the printer 1 acts as the distribution device which includes the function to distribute the setting information set to the printer 1 itself to other devices on the network, and each of the printers 2 to 5 acts as the reception-side image processing device which includes the function to receive the distributed setting information and set the received setting information as its own setting information. However, the present invention is not limited to this. That is, the printer 1 may include the function as the reception-side image processing device, and each of the printers 2 to 5 may include the function as the distribution device. In other words, each of all the printers 1 to 5 may include both the function as the distribution device and the function as the reception-side image processing device. Besides, the network 6 is not limited to the wired network. Namely, the network 6 may be a wireless network, e.g., a wireless LAN.

In addition, the distribution device is not limited to the printer. Namely, the distribution device may be a multifunction device, a copying device, a scanner, a facsimile device, or another kind of image processing device. Furthermore, the distribution device may be a personal computer, a server computer, a workstation, or another kind of information processing device. Also, the reception-side image processing device is not limited to the printer. Namely, the reception-side image processing device may be a multifunction device, a copying device, a scanner, or a facsimile device.

Figure 2:
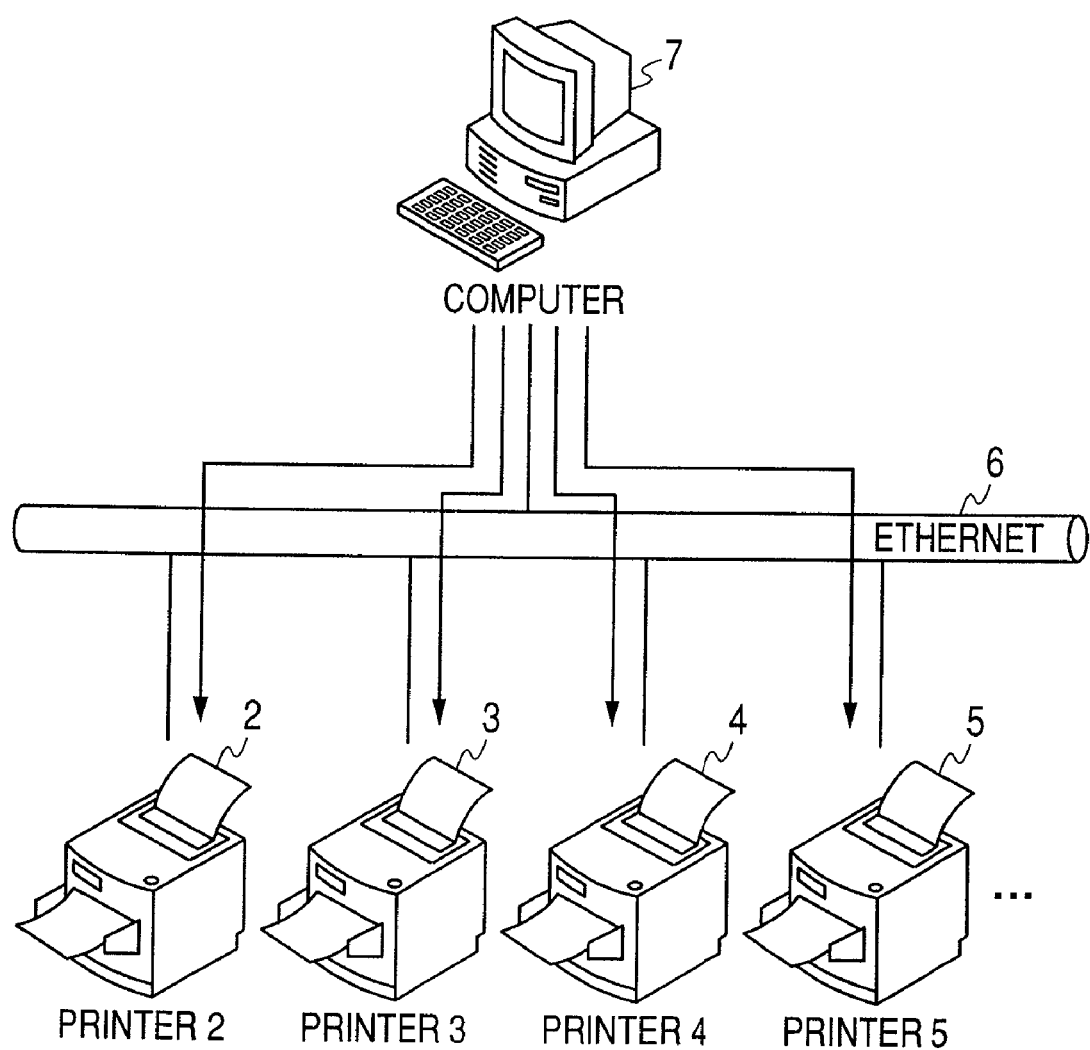
FIG. 2 is a diagram illustrating an example of a system which includes a distribution device and reception-side image processing devices.

FIG. 2 is a diagram illustrating a system structure in which an information processing device such as a personal computer is used as the distribution device. In this case, the setting information input by the user to a personal computer 7 is distributed to reception-side printers 2 to 5 (i.e., printers 2 to 5 provided on a reception side), and the distributed setting information is set to each of the printers 2 to 5.

In FIGS. 1 and 2, the four printers 2 to 5 are connected as the reception-side image processing devices. However, the present invention is not limited to this. Namely, more than four printers may be connected to the network 6 as the reception-side image processing devices.

Figure 3:
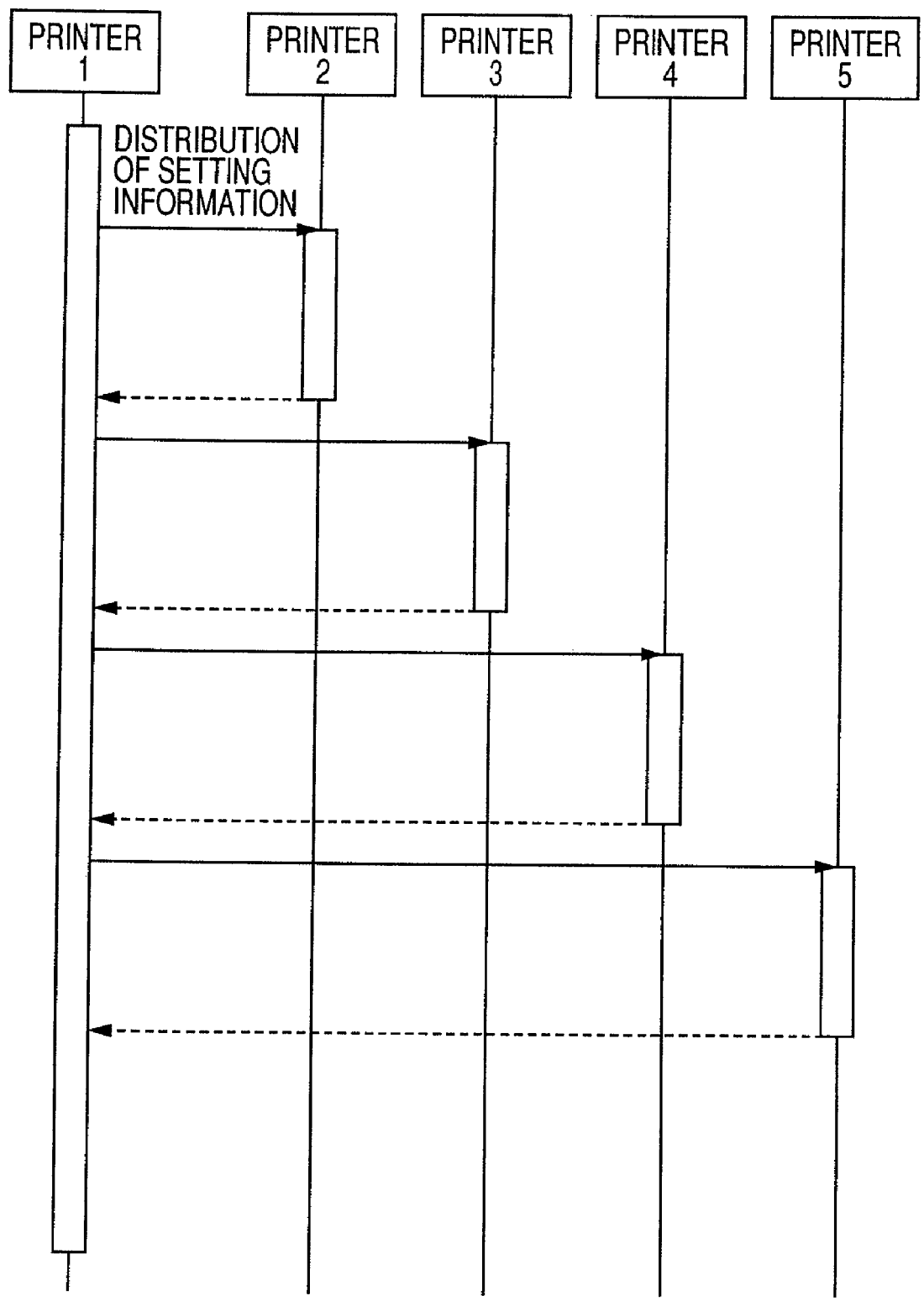
FIG. 3 is a sequence diagram illustrating flows of distribution of setting information.

FIG. 3 is a sequence diagram illustrating flows of distribution of the setting information from the printer 1 to the printers 2 to 5 and setting of the setting information to the printers 2 to 5, in the system illustrated in FIG. 1.

If it is instructed in the printer 1 to distribute the setting information, the printer 1 first distributes the setting information to the printer 2. The printer 2, which received the setting information, sets the received setting information as its own setting information, and then the printer 2 notifies the printer 1 that the setting of the received setting information ended. The printer 1, which received such a notification from the printer 2, distributes the setting information to the printer 3. Subsequently, the printer 1 repeats the same distribution process to the printers 4 and 5 in sequence.

Figure 4:
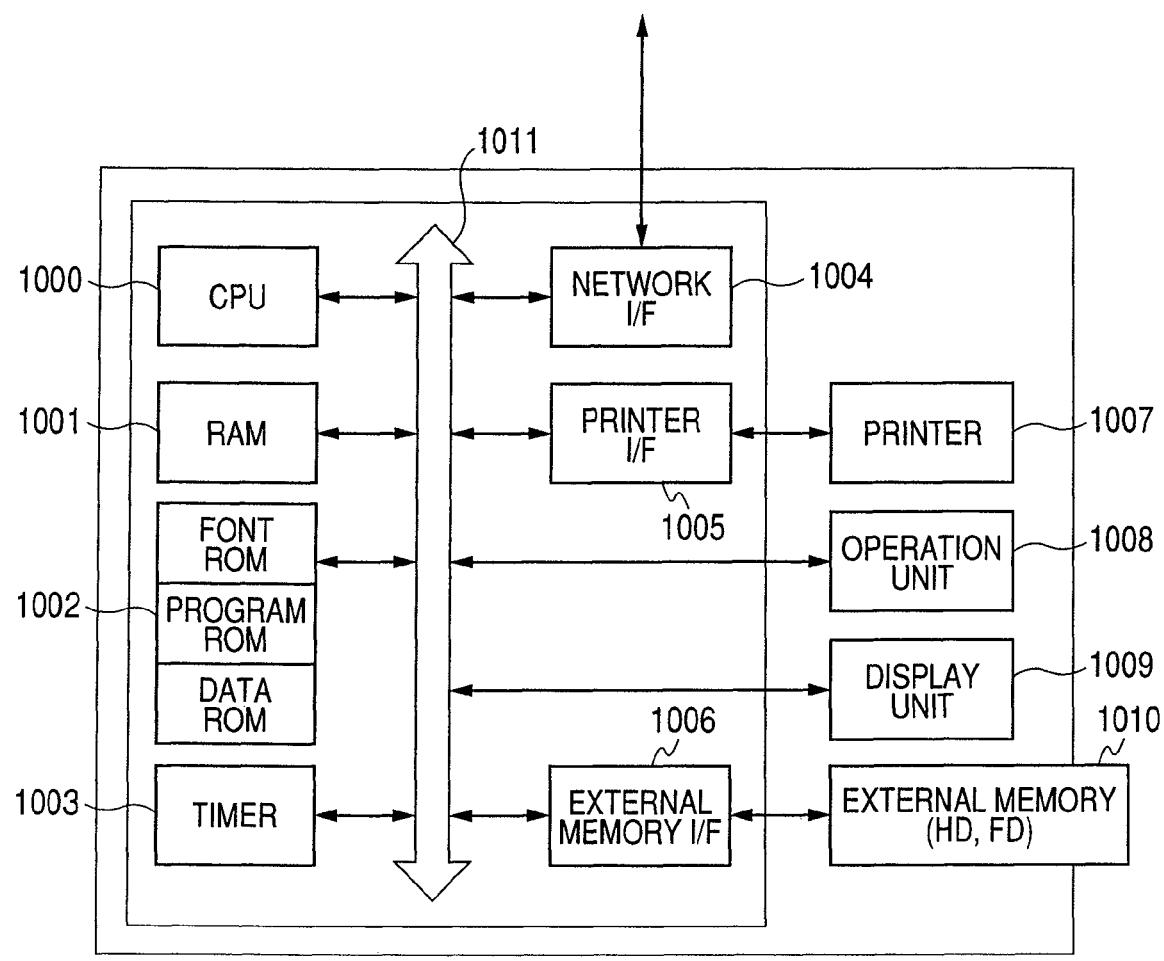
FIG. 4 is a block diagram illustrating a constitution of a printer according to the embodiment.

FIG. 4 is a block diagram illustrating a constitution of each of the printers 1 to 5. In FIG. 4, a CPU 1000 executes a process based on a control program stored in a program ROM (read only memory) of a ROM 1002 or in an external memory 1010. For example, the CPU 1000 outputs an image signal as output information to a printer 1007 through a printer I/F 1005 connected to a system bus 1011. Besides, the program ROM of the ROM 1002 stores therein other programs as well as the control program for the CPU 1000, the printer 1 stores therein a control program for distributing the setting information, and each of the printers 2 to 5 stores therein a control program for receiving the distributed setting information and for setting the received information as its own setting information. A font ROM of the ROM 1002 stores therein font data or the like to be used to generate the output information. The CPU 1000, which is connected to a network through a network I/F (interface) 1004, can thus execute a communication process to other devices connected on the network. Further, the printer 1 distributes the setting information of own device through the network I/F 1004. On the other hand, each of the printers 2 to 5 receives the setting information distributed from the distribution device through the network I/F 1004. A RAM (random access memory) 1001, which functions as a main memory, a working area and the like for the CPU 1000, is constituted so that the memory capacity thereof can be expanded by means of an option RAM connected to a not-illustrated expansion port. Incidentally, the RAM 1001 is used as an output information extraction area, an environment data storage area, an NVRAM (NonVolatile RAM), and the like. A display unit 1009 displays various information for print service users. Accessing to the external memory 1010 such as an HD (hard disk), an FD (flexible disk), an IC card or the like is controlled by an external memory I/F 1006. Here, the external memory 1010 is connected as an option, and stores therein font data, an emulation program, form data and the like. An operation panel 1008, which acts as a user interface, includes thereon various operation switches, a touch-panel display, and the like. Incidentally, it should be noted that, although FIG. 4 illustrates only one external memory, two or more external memories may be provided. Further, an option font card storing thereon option fonts (other than built-in fonts), and plural external memories respectively storing therein programs for interpreting different kinds of printer languages may be connected to the printer. Furthermore, a not-illustrated NVRAM may be connected to the printer so that the setting information input through the operation panel 1008 can be stored. Besides, a timer 1003 is used to check whether or not a validity duration of a certificate expires. Here, it should be noted that the ROM 1002 may have a timer function same as that of the timer 1003, or the printer may have an external timer.

Figure 5:
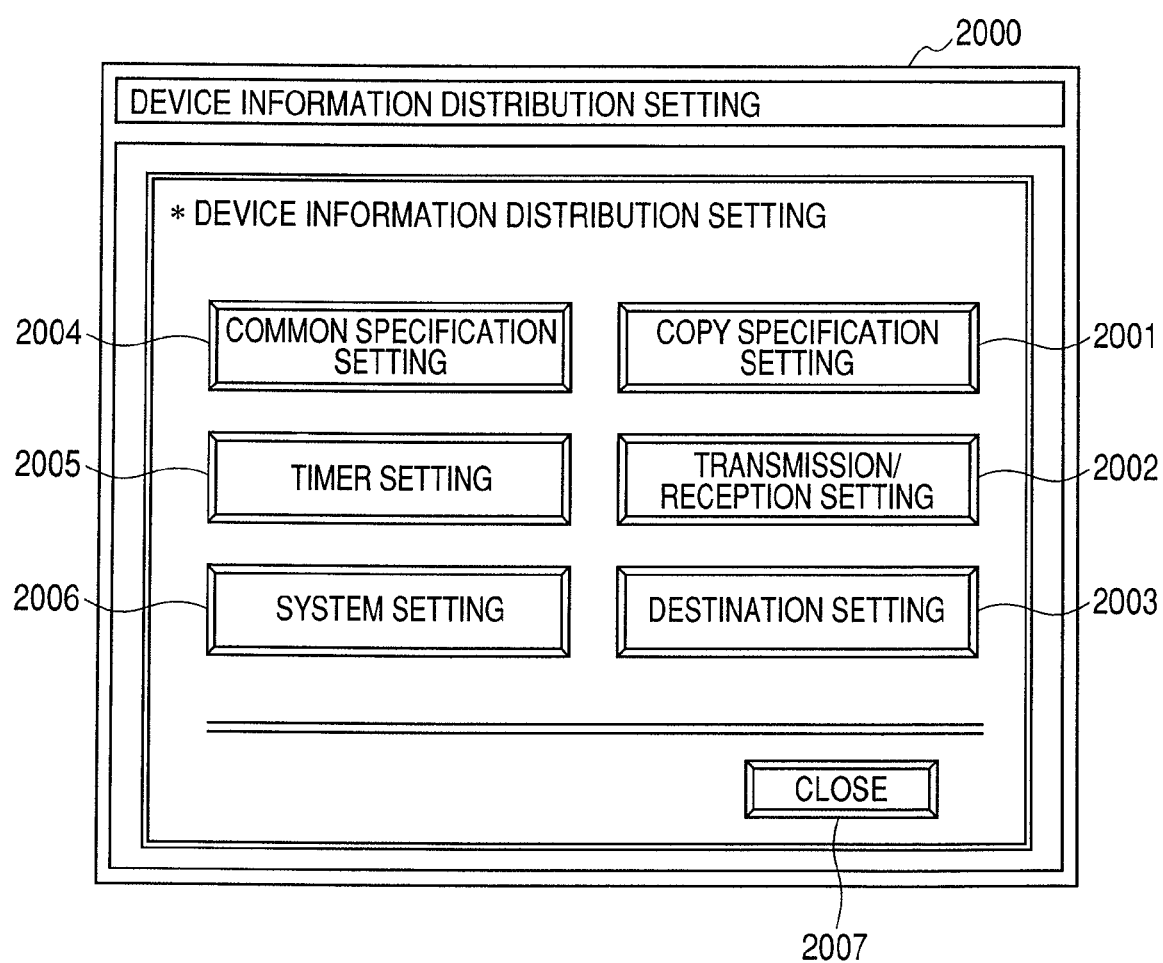
FIG. 5 is a diagram illustrating a screen for registering setting information to be distributed, on a printer 1 according to the embodiment.

FIG. 5 is a diagram illustrating a screen 2000 for registering the setting information to be distributed, on the printer 1. Namely, it is possible on the screen 2000 to select which setting information should be distributed.

In FIG. 5, buttons 2001, 2002, 2003, 2004, 2005 and 2006 are respectively used to select various kinds of setting information to be distributed. Namely, if the user selects any one of the buttons 2001, 2002, 2003, 2004, 2005 and 2006, the screen illustrated in FIG. 5 advances to a next screen for selecting items of the setting information to be distributed.

Incidentally, a button 2007 is used to close the relevant screen and return to one-superordinate screen.

Figure 6:
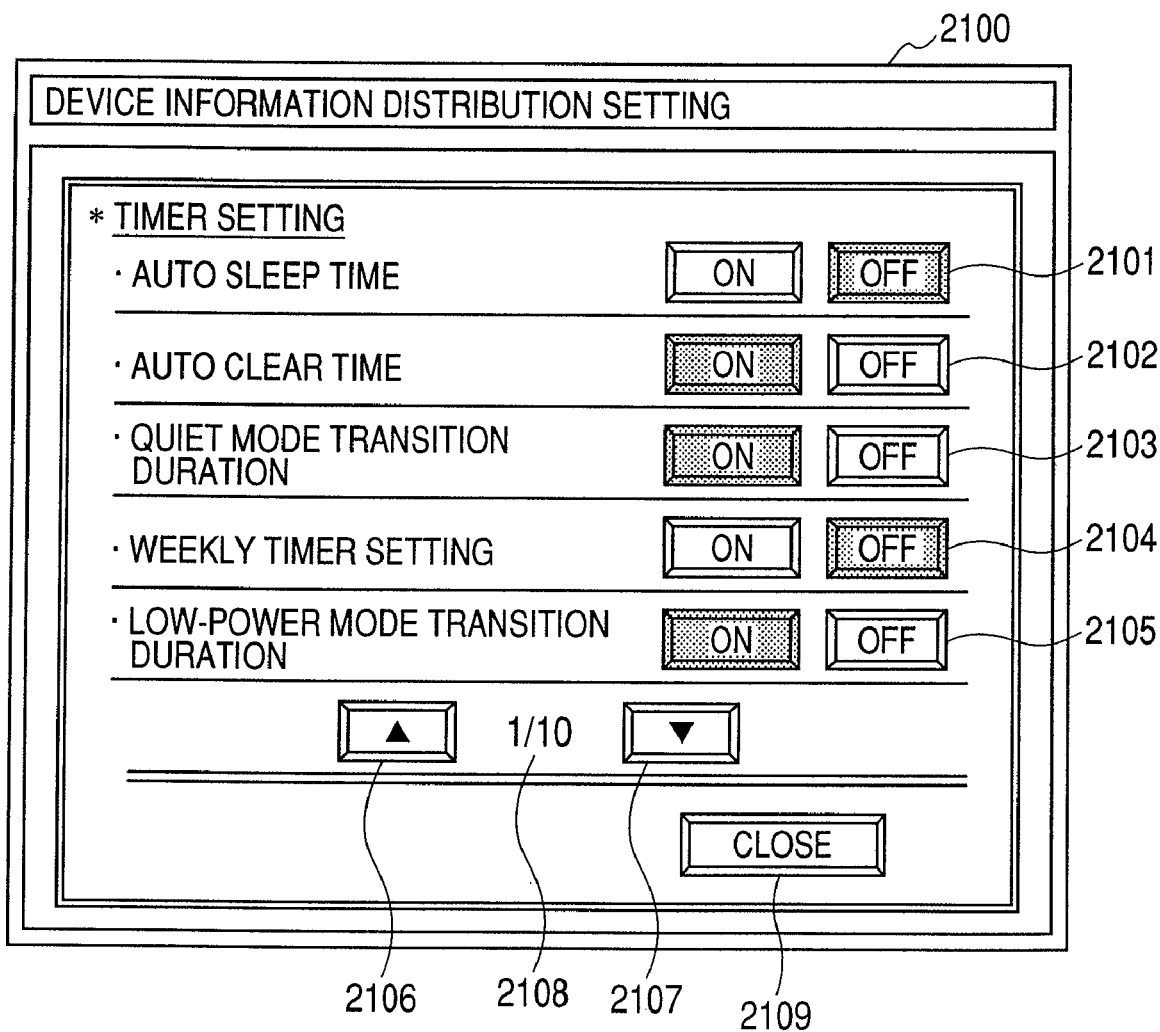
FIG. 6 is a diagram illustrating a screen for registering the setting information to be distributed, on the printer 1 according to the embodiment.

FIG. 6 is a diagram illustrating a screen 2100 which is displayed on the operation panel when the user selects the "timer setting" button 2005 as the kind of setting information on the screen 2000 illustrated in FIG. 5. In FIG. 6, the user can select the items to be distributed, in regard to the timer setting from among the plural kinds of setting information set in the printer 1. Incidentally, an indicator 2108 indicates that there are ten-page items in regard to the timer setting and that a first page is currently displayed. Further, a button 2106 is used to display a previous page, and a button 2107 is used to display a subsequent page. Furthermore, buttons 2101, 2102, 2103, 2104 and 2105 are used to set whether or not to register the respective setting items to be distributed in regard to the timer setting. Namely, if "ON" of the certain button is selected, the relevant item is set to be distributed. On the other hand, if "NO" thereof is selected, the relevant item is not set to be distributed. For example, in FIG. 6, from among the items in regard to the timer setting, the setting information of the three items "auto clear time", "quiet mode transition duration" and "low-power mode transition duration" is selected as the items to be distributed. Incidentally, a button 2109 is used to close the relevant screen and return to one-superordinate screen.

Figure 7:
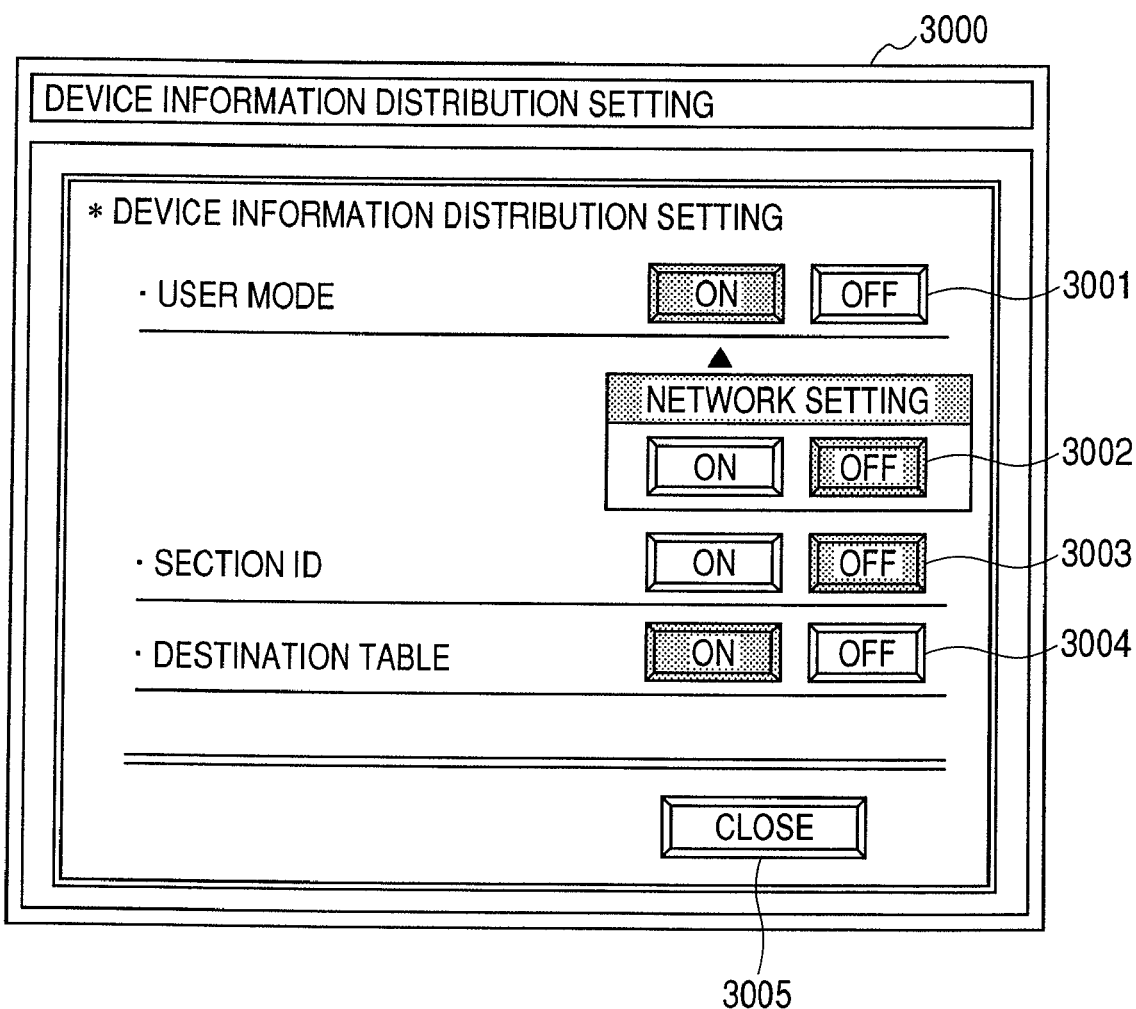
FIG. 7 is a diagram illustrating a screen for registering the setting information to be distributed, on the printer 1 according to the embodiment.

FIG. 7 is a diagram illustrating another example of the screen for registering the setting information to be distributed, on the printer 1. In the examples illustrated in FIGS. 5 and 6, it is necessary to register whether or not to set each of the items of the setting information set in the printer 1 to be distributed. On the other hand, in the example illustrated in FIG. 7, the items that it is registered whether or not to distribute are grouped, whereby the user can register in a lump whether or not to distribute the grouped items.

A screen 3000 is concretely displayed on the operation panel of the printer 1.

A button 3001 is used to select whether or not to distribute an aggregate of the setting information grouped as a user mode. Here, it should be noted that the setting information classified and grouped as the user mode here implies the information except for network setting information, device own information (device name, etc.) and information of which being distributed is undesirable due to security reason (authentication information, etc.), from among respective device setting information. For example, the setting information classified and grouped here includes ON/OFF setting of a device buzzer sound, timer setting (auto sleep time setting), copy specification setting (image direction setting, ON/OFF setting of copy waiting time display function), and the like.

A button 3002 is used to select whether or not to distribute an aggregate of the setting information grouped as network setting. On the screen illustrated in FIG. 7, only when the user mode distribution setting is selected ("ON") by the button 3001, the distribution setting can be executed. Here, it should be noted that the setting information classified and grouped as the network setting indicates ON/OFF of various kinds of server functions of the device, and location information of a network service function used by the device. For example, the relevant information includes ON/OFF of an HTTP (HyperText Transport Protocol) function, ON/OFF of an LPD (Line Printer Daemon Protocol) function, address information of an SMTP (Simple Mail Transfer Protocol) server, and the like.

A button 3003 is used to select whether or not to distribute an aggregate of the setting information grouped as section ID information. Here, it should be noted that the setting information classified and grouped as the section ID information here implies, for example, information for setting an ID number and a password for each section and setting limitation/management of use of the device based on the ID number and the password. In addition, card ID management information used when an IC card is used, and system manager information of a manager of the device, and the like are classified as the relevant setting information. In any case, if the relevant setting information comes into effect, the whole of the above information is considered to have been selected and thus the device operates.

A button 3004 is used to select whether or not to distribute an aggregate of the setting information grouped as a destination table. Here, it should be noted that the setting information classified and grouped as the destination table here implies items acquired by classifying information necessary in a case where the device is equipped with a data transmission function. For example, address book information (destination names, telephone numbers, facsimile numbers, E-mail addresses, etc.) stored in the device, information defining an operation when the device transmits data, and information defining an operation when the device receives data are classified. Incidentally, a button 3005 is used to close the relevant screen.

On the premise of such a system of distributing the setting information, first to fifth embodiments will be described hereinafter.

First Embodiment

Figure 8:
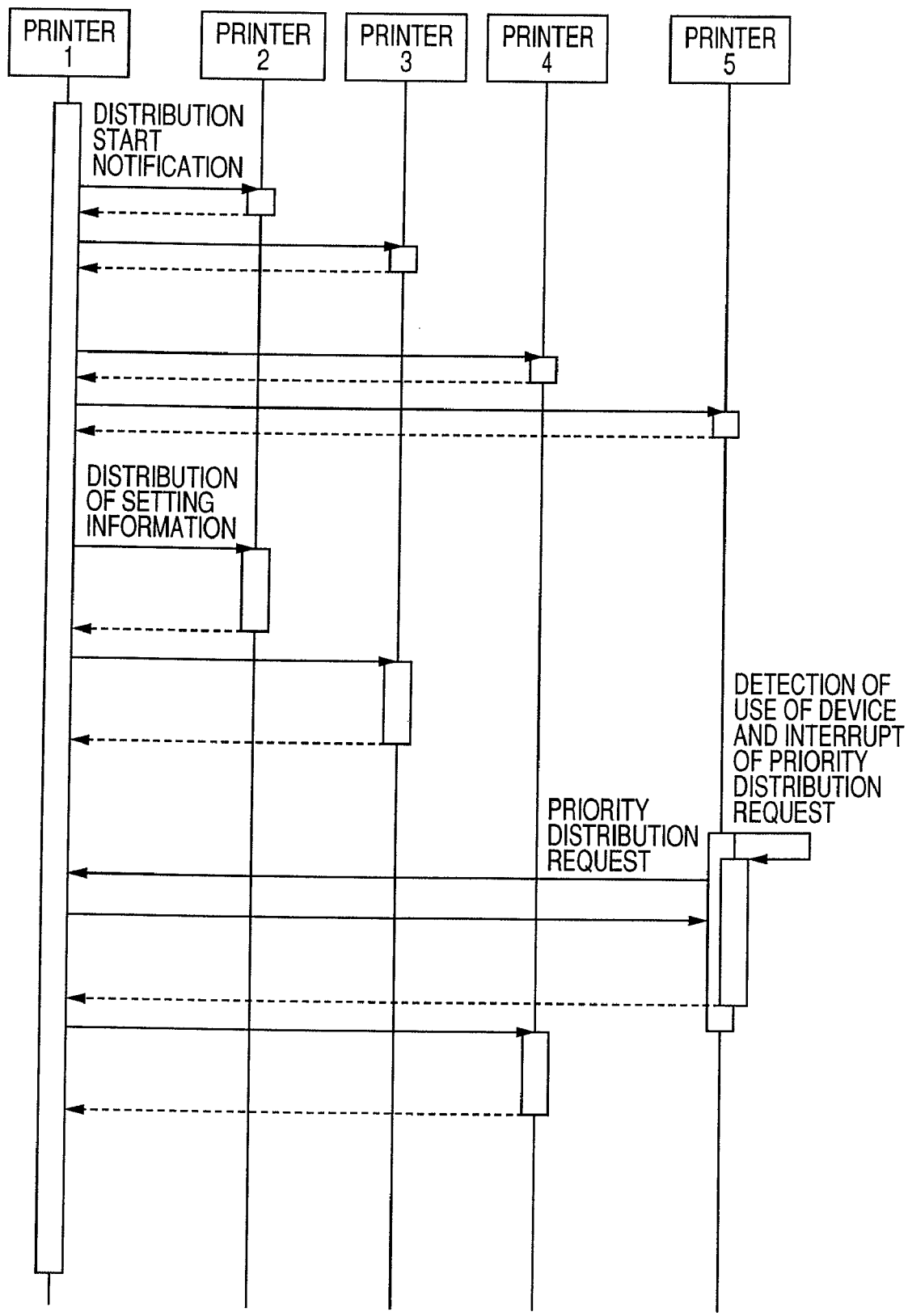
FIG. 8 is a sequence diagram illustrating a process of the system according to the first embodiment.

FIG. 8 is a sequence diagram illustrating a process of the system according to the first embodiment. More specifically, FIG. 8 illustrates flows of distribution of the setting information and actual setting of the distributed setting information.

That is, in FIG. 8, the setting information is distributed from the printer 1 acting as the distribution device to the printers 2 to 5 on the reception side.

In the present embodiment, when the printer 1 distributes the setting information to the printers 2 to 5, the printer 1 first distributes a distribution start notification to the printers 2 to 5. Here, it should be noted that the distribution start notification is information for notifying reception-side devices (i.e., the printers 2 to 5) that a distribution device (i.e., the printer 1) starts distributing the setting information. Since the distribution start notification does not include actual setting information, a data amount thereof is small, whereby it is possible to transmit it to the plural reception-side devices with small traffic. More specifically, the distribution start notification is broadcasted onto the network. Incidentally, the distribution start notification can include information explicitly indicating that the distribution device starts distributing the setting information. Alternatively, the distribution start notification may be, for example, an inquiry packet of inquiring whether or not a device which receives the distribution start notification has a function to receive the setting information. This is because the reception-side device, which received the inquiry packet, can know that the setting information will be distributed subsequently.

The printer 1, which acts as the distribution device of distributing the setting information, starts transmitting the distribution start notification, and then distributes the setting information to the printers 2 to 5 one by one. Consequently, with respect to the printer 5 of which order of receiving the setting information is the last, a certain-duration time lag between the reception of the transmitted distribution start notification and the reception of the distributed setting information occurs. To cope with such a disadvantage, in the present embodiment, if the reception-side printer 5, which received the distribution start notification, does not receive the setting information when operated by a user, the printer 5 actively requests the printer 1 acting as the distribution device to distribute the setting information. In FIG. 8, immediately after the printer 1 distributed the setting information to the printers 2 and 3, the printer 5 is operated by the user. Thus, in this case, the printer 5 requests the printer 1 to distribute the setting information, and then the printer 1, which received the request from the printer 5, actually distributes the setting information to the printer 5 prior to the printer 4.

Consequently, it is possible to prevent that the user, who operates the printer 5, uses the printer 5 on which the setting information is not yet reflected.

Figure 9:
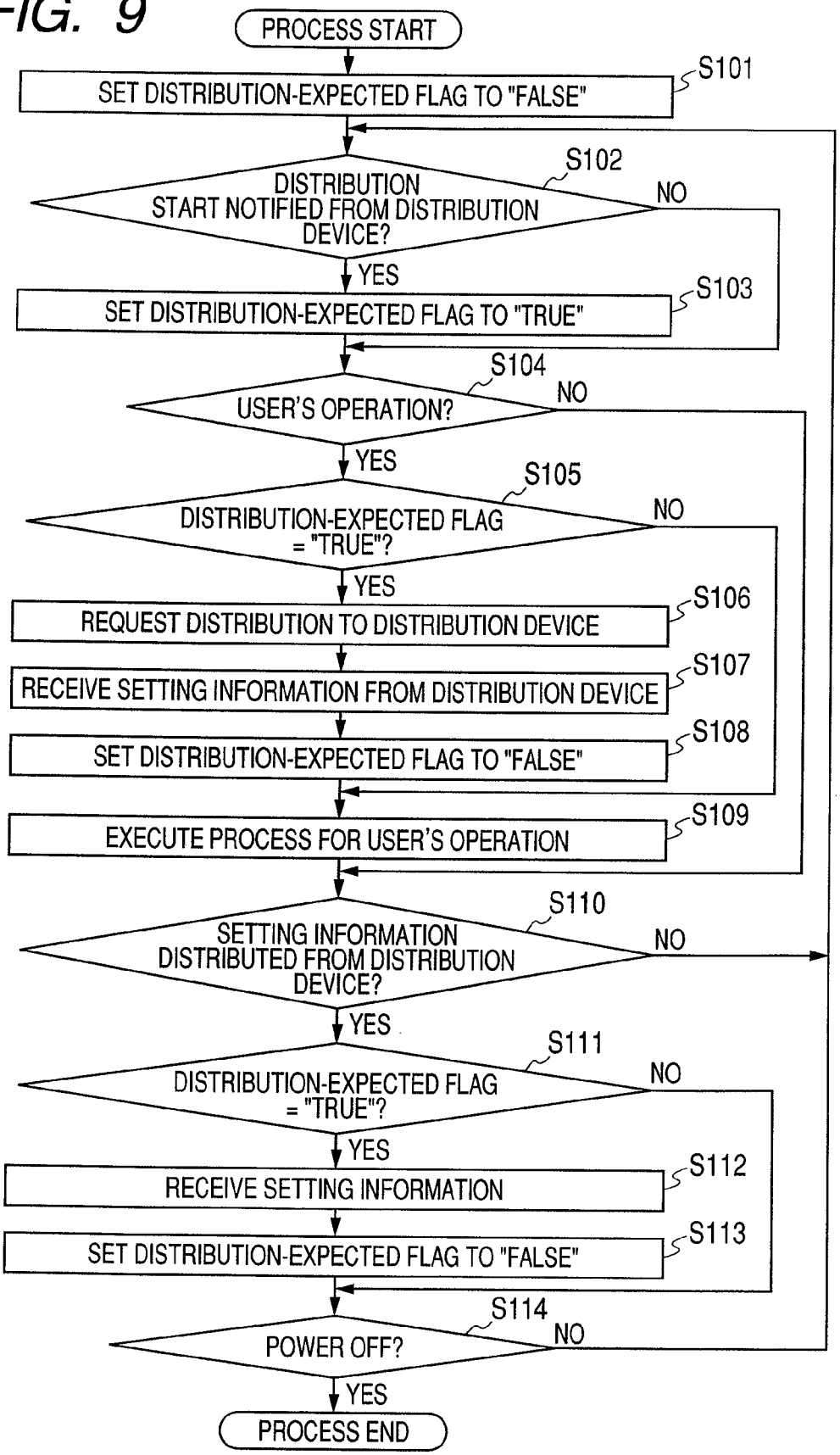
FIG. 9 is a flow chart illustrating a process flow to be executed by a reception-side printer, according to the first embodiment.

FIG. 9 is a flow chart illustrating the process to be executed by each of the reception-side printers 2 to 5, according to the present embodiment.

The process in the flow chart illustrated in FIG. 9 starts when a power of each of the printers 2 to 5 is turned on, and respective steps in the flow chart are executed on the premise that the CPU 1000 executes a control program stored in each of the printers 2 to 5.

First, in a step S101, the CPU 1000 writes "FALSE" in a distribution-expected flag held in the memory. Then, in a step S102, the CPU 1000 determines whether or not the distribution start notification is received from the printer 1 acting as the distribution device of distributing the setting information. If it is determined that the distribution start notification is received, the flow advances to a step S103. In the step S103, the CPU 1000 writes "TRUE" in the distribution-expected flag. On the other hand, if it is determined that the distribution start notification is not received, the flow advances to a step S104.

In the step S104, the CPU 1000 detects whether or not some operation is executed by a user through the operation unit. If it is not detected that an operation is executed by the user, the flow advances to a step S110. On the other hand, if it is detected that an operation is executed by the user, the flow advances to a step S105.

In the step S105, the CPU 1000 determines whether or not the distribution-expected flag held in the memory is "TRUE". If it is determined that the distribution-expected flag is "TRUE", the flow advances to a step S106. On the other hand, if it is determined that the distribution-expected flag is not "TRUE" (that is, the distribution-expected flag is "FALSE"), the flow advances to a step S109. In the step S106, the CPU 1000 requests the printer 1, which acts as the distribution device of distributing the setting information, to distribute the setting information. More specifically, the CPU 1000 refers to an address of the transmission source of the distribution start notification received in the step S102, and transmits a distribution request packet to the relevant address through the network I/F 1004. Namely, in the present embodiment, the fact that "TRUE" has been written in the distribution-expected flag implies that the setting information is not yet distributed to own device although the distribution start notification was received from the distribution device.

In a step S107, the CPU 1000 receives the setting information distributed from the printer 1 in response to the request in the step S106. After then, the received setting information is set as the setting information of own device. More specifically, the received setting information is overwritten on the setting information stored in the memory such as the HD 1010 or the like. Then, in a step S108, the CPU 1000 writes "FALSE" in the distribution-expected flag.

Subsequently, in the step S109, the CPU 1000 executes a process according to the user's operation input in the step S104. Here, it is possible to execute the process according to the user's operation in the state that the setting information distributed from the printer 1 has been reflected.

In the step S110, the CPU 1000 determines whether or not the setting information is distributed from the printer 1 acting as the distribution device of distributing the setting information. In a step S111, the CPU 1000 determines whether or not the distribution-expected flag is "TRUE". If it is determined that the distribution-expected flag is "TRUE", the flow advances to a step S112. In the step S112, the CPU 1000 receives the setting information distributed from the printer 1, and then sets the received setting information as the setting information of own device. Then, in a step S113, the CPU 1000 writes "FALSE" in the distribution-expected flag. On the other hand, if it is determined in the step S111 that the distribution-expected flag is not "TRUE" (that is, the distribution-expected flag is "FALSE"), the CPU 1000 does not receive the setting information distributed from the printer 1 (otherwise, the CPU 1000 does not set the setting information, even if the relevant setting information is received), and the flow advances to a step S114. That is, in the present embodiment, the fact that "FALSE" has been written in the distribution-expected flag implies that the setting information distributed by the distribution device has already been received by own device.

In the step S114, the CPU 1000 determines whether or not the power is turned off. If it is determined that the power is turned off, the process ends. On the other hand, if it is determined that the power is not turned off, the flow returns to the step S102.

As described above, according to the present embodiment, it is possible to prevent that, after the reception-side printer received the distribution start notification from the printer acting as the distribution device, the reception-side printer executes the process designated by the user in the state that the setting information is not yet received. In other words, the reception-side device can execute the process designated by the user in the state that the setting information was received and thus the received setting information has been set.

Second Embodiment

In the first embodiment, if the user's operation is executed, each of the reception-side printers 2 to 5 requests the printer 1 acting as the distribution device to distribute the setting information irrespective of the content of the operation in progress. However, there is a possibility that, according to the content of the user's operation, each of the reception-side printers 2 to 5 executes the process which is quite irrelevant to the setting information which will be distributed in the future. In such a case, it is unnecessary to immediately acquire the setting information from the printer 1 acting as the distribution device. For example, in a case where the content of the user's operation is the setting for a copying operation, if the setting information which will be distributed in future from the distribution device is the destination table for a facsimile transmission, it is apparent that the relevant setting information is not immediately necessary for the reception-side printer.

Consequently, the second embodiment is characterized in that the reception-side device can select whether or not to immediately acquire the setting information, according to the process content instructed by the user.

Figure 10:
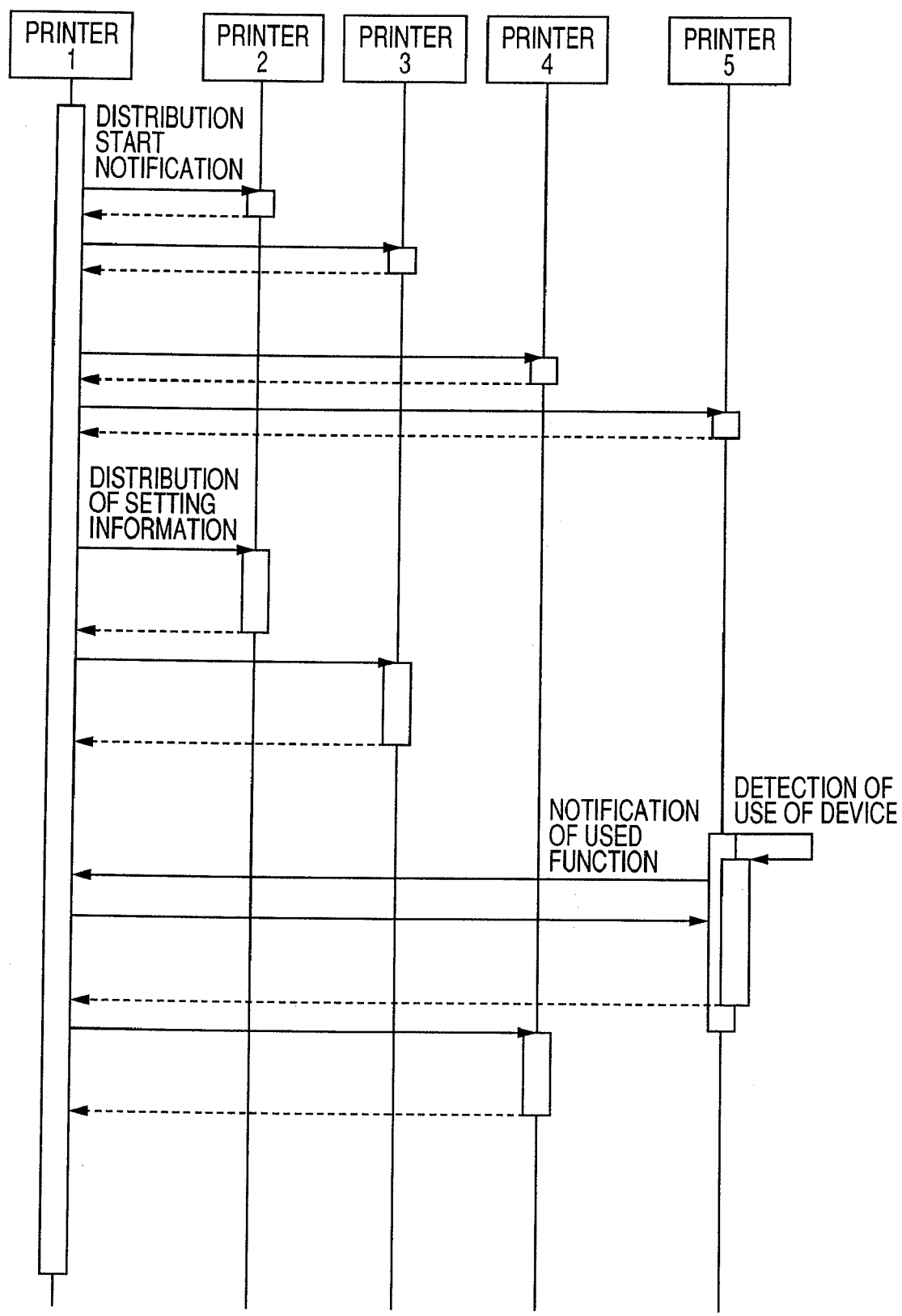
FIG. 10 is a sequence diagram illustrating a process of the system according to the second embodiment.

FIG. 10 is a sequence diagram illustrating a process of the system according to the second embodiment. More specifically, FIG. 10 illustrates flows of distribution of the setting information and actual setting of the distributed setting information.

Here, it should be noted that the rough flow of the process sequence of the second embodiment illustrated in FIG. 10 is the same as that of the first embodiment illustrated in FIG. 8. Accordingly, only the portions different from the first embodiment will be described hereinafter.

If the reception-side printer 5 detects that the printer 5 is operated by the user, the printer 5 notifies the printer 1 of the content of the detected user's operation. Then, the printer 1 determines whether or not the acquired content of the detected user's operation is relevant to the setting information that the printer 1 intends to distribute, and notifies the printer 5 of the determined result. If it is determined by the printer 1 that the content of the user's operation is relevant to the setting information, the printer 5 requests the printer 1 to distribute the setting information. On the other hand, if it is determined by the printer 1 that the content of the user's operation is irrelevant to the setting information, the printer 5 does not request distribution of the setting information and executes the process according to the content of the operation instructed by the user.

Figure 11A:
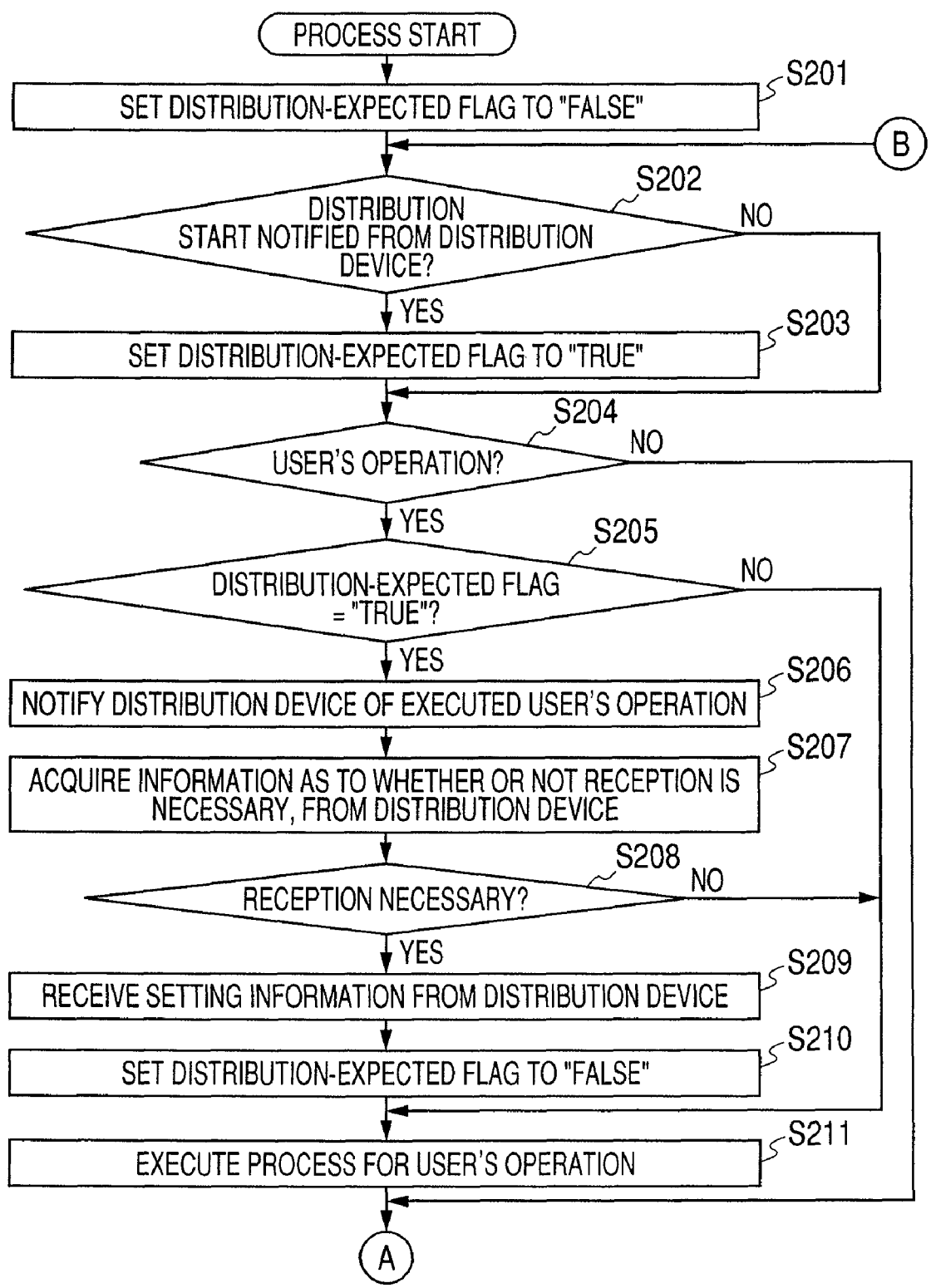
FIG. 11, which is composed of FIGS. 11A and 11B, is a flow chart illustrating a process flow to be executed by the reception-side printer, according to the second embodiment.

FIG. 11, which is composed of FIGS. 11A and 11B, is a flow chart illustrating a process flow to be executed by each of the reception-side printers 2 to 5, which receives the setting information, according to the second embodiment.

As well as the process in the flow chart illustrated in FIG. 9, the process in the flow chart illustrated in FIGS. 11A and 11B starts when a power of each of the printers 2 to 5 is turned on, and respective steps in the flow chart are executed on the premise that the CPU 1000 executes a control program stored in each of the printers 2 to 5.

In the present embodiment, only processes different from the flow chart illustrated in FIG. 9 will be described hereinafter. Namely, the processes in steps S206, S207 and S208 are different from the flow chart illustrated in FIG. 9.

If the CPU 1000 of each of the printers 2 to 5 detects a user's operation in a step S204, the flow advances to a step S205 to determine whether or not the distribution-expected flag is "TRUE". Then, if it is determined that the distribution-expected flag is "TRUE", the flow advances to the step S206.

In the step S206, the CPU 1000 notifies the printer 1, acting as the distribution device, of the content of the operation (i.e., the content of the process to be executed) input in the step S204. Then, the printer 1, which received such a notification, determines whether or not the setting information to be distributed is relevant to the content of the notified process, and then transmits the determined result to the reception-side device.

In the step S207, the CPU 1000 receives the information indicating whether or not the setting information to be distributed is relevant to the content of the process to be executed, from the printer 1 through the network I/F 1004. Then, in the step S208, the CPU 1000 determines whether or not it is necessary to receive the setting information from the printer 1. More specifically, if the information received in the step S207 is the information indicating "the setting information to be distributed is relevant to the content of the process to be executed", it is determined that it is necessary to receive the setting information. On the other hand, if the information received in the step S207 is the information indicating "the setting information to be distributed is irrelevant to the content of the process to be executed", it is determined that it is unnecessary to receive the setting information.

If it is determined in the step S208 that it is necessary to receive the setting information, the flow advances to a step S209. In the step S209, the CPU 1000 requests the printer 1 to distribute the setting information.

It should be noted that the subsequent steps in the present embodiment are the same as those in the first embodiment illustrated in FIG. 9.

Incidentally, in FIGS. 11A and 11B, if it is determined in the step S208 that it is necessary to receive the setting information, the whole of the setting information to be distributed is received in the step S209. However, in the step S209, only a part of the setting information may be received. Here, it should be noted that the part of the setting information indicates, from the whole setting information to be distributed, only the items of the setting information relevant to the content of the operation input in the step S204. That is, in a case where a data amount of the whole setting information is large but a data amount of only the setting information relevant to the content of the operation is small, such a modification is more effective because a user's queuing time is shortened. However, a process in a step S210 is not executed in that case. In other words, after the part of the setting information was received in the step S209, it is set not to write "FALSE" in the distribution-expected flag. Thus, it is possible in a later step S214 to receive the remaining setting information not received in the step S209.

As described above, according to the present embodiment, it is possible to prevent that the setting information irrelevant to the process that the user intends to actually execute from now is immediately acquired. Consequently, it is possible to eliminate a problem that the user has to wait to execute a desired process due to an unimportant operation that irrelevant setting information is acquired immediately.

Moreover, in case of immediately acquiring the setting information, it is possible to receive, from the whole setting information to be distributed, only the setting information relevant to the process to be executed. By doing so, the user's queuing time for reception and setting of the setting information is shortened, whereby it is more convenient.

Third Embodiment

In the above-described first and second embodiments, the distribution start notification, which is transmitted by the printer 1 distributing the setting information, includes only the information indicating that the setting information is distributed in the future. However, it is also possible to include in the distribution start notification the setting items of the setting information to be distributed and transmit the thus acquired distribution start notification to the reception-side printers 2 to 5. By doing so, the reception-side device can previously know the setting items of the setting information to be distributed in the future.

FIG. 12 is a diagram illustrating an example of a data structure of the setting information to be distributed from the printer 1 acting as the distribution device, according to the present embodiment. More specifically, in FIG. 12, ON/OFF settings of settings 1 to 7 are described with respect to each of functions 1 to 24. Here, it should be noted that FIG. 12 has been simplified in order to describe the characteristic of the present embodiment, and it is needless to say that the actual setting information is more complicated. For example, it is conceivable that the ON/OFF setting is replaced with numerical data. Further, it is conceivable that the number of settings is made different with respect to each function. Furthermore, it is conceivable that a higher format such as an XML (eXtensible Markup Language) format is used as a data format.

In FIG. 12, the data of only the contents of the leftmost column, that is, the data indicating that the data will be distributed with respect to the functions 1 to 24, is included in the distribution start notification. That is, the distribution start notification does not include the data of the second and subsequent columns, because the relevant data are distributed when the actual setting information is distributed.

Figure 13:
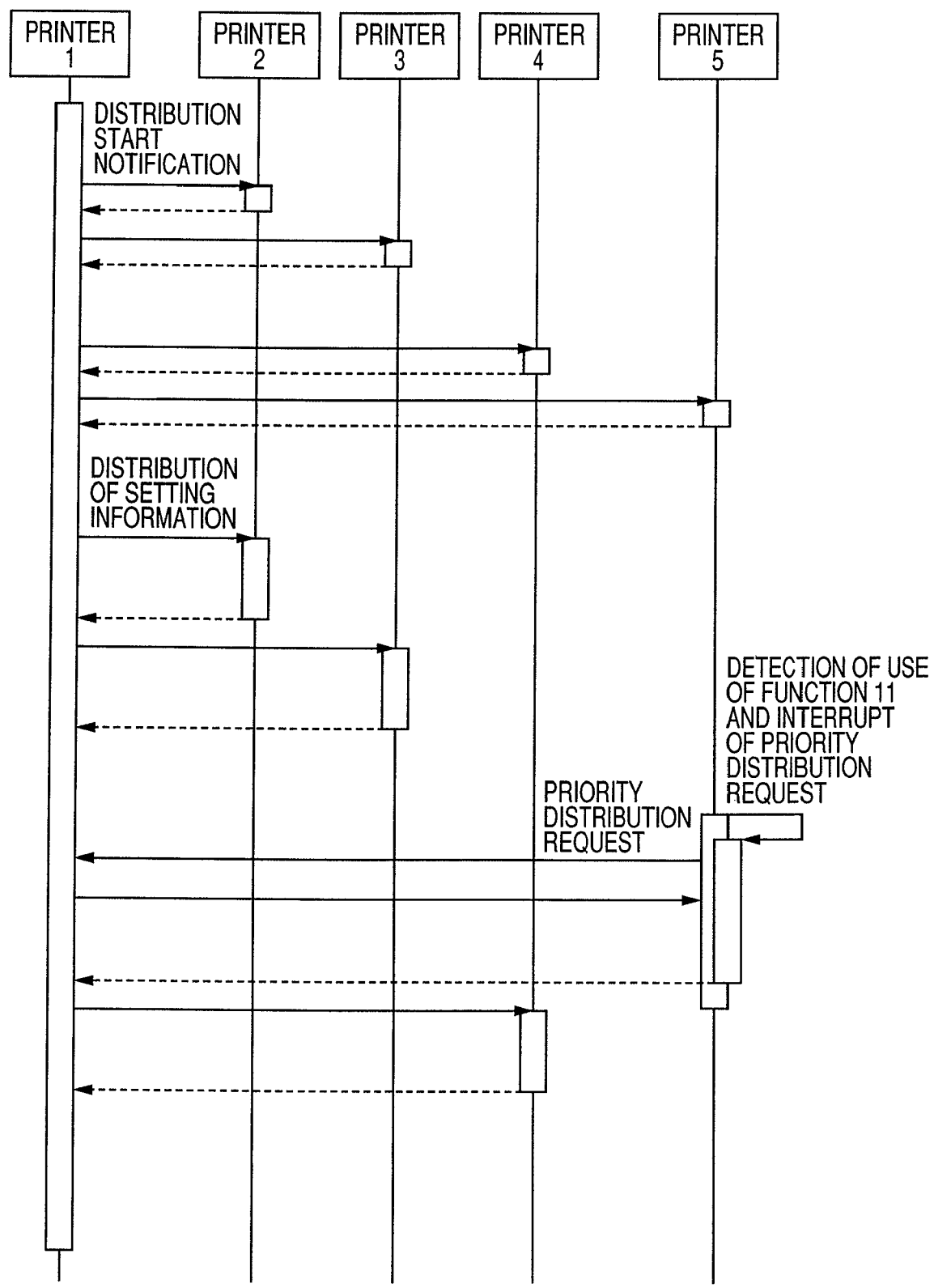
FIG. 13 is a sequence diagram illustrating a process of the system according to the third embodiment.

FIG. 13 is a sequence diagram illustrating a process of the system according to the third embodiment. More specifically, FIG. 13 illustrates flows of distribution of the setting information and actual setting of the distributed setting information.

Here, it should be noted that the rough flow of the process sequence of the third embodiment illustrated in FIG. 13 is the same as that of the first embodiment illustrated in FIG. 8. Accordingly, only the portions different from the first embodiment will be described hereinafter.

The printer 1 notifies each of the printers 2 to 5 of the distribution start notification which includes a distribution-expected function list showing the items of the setting information to be distributed. Then, if it is detected by the printer 5 that the printer 5 is operated by the user, the printer 5 analyzes the content of the user's operation and thus determines whether or not the setting information relevant to the process to be executed by the user's operation is included in the distribution-expected function list. Here, if it is determined that the setting information relevant to the process to be executed by the user's operation is included in the distribution-expected function list, the printer 5 requests the printer 1 to distribute the relevant setting information. On the other hand, if it is determined that the setting information relevant to the process to be executed by the user's operation is not included in the distribution-expected function list, the printer 5 does not the printer 1 to distribute the relevant setting information. In this case, the printer 5 executes the process according to the operation content instructed by the user.

Figure 14A:
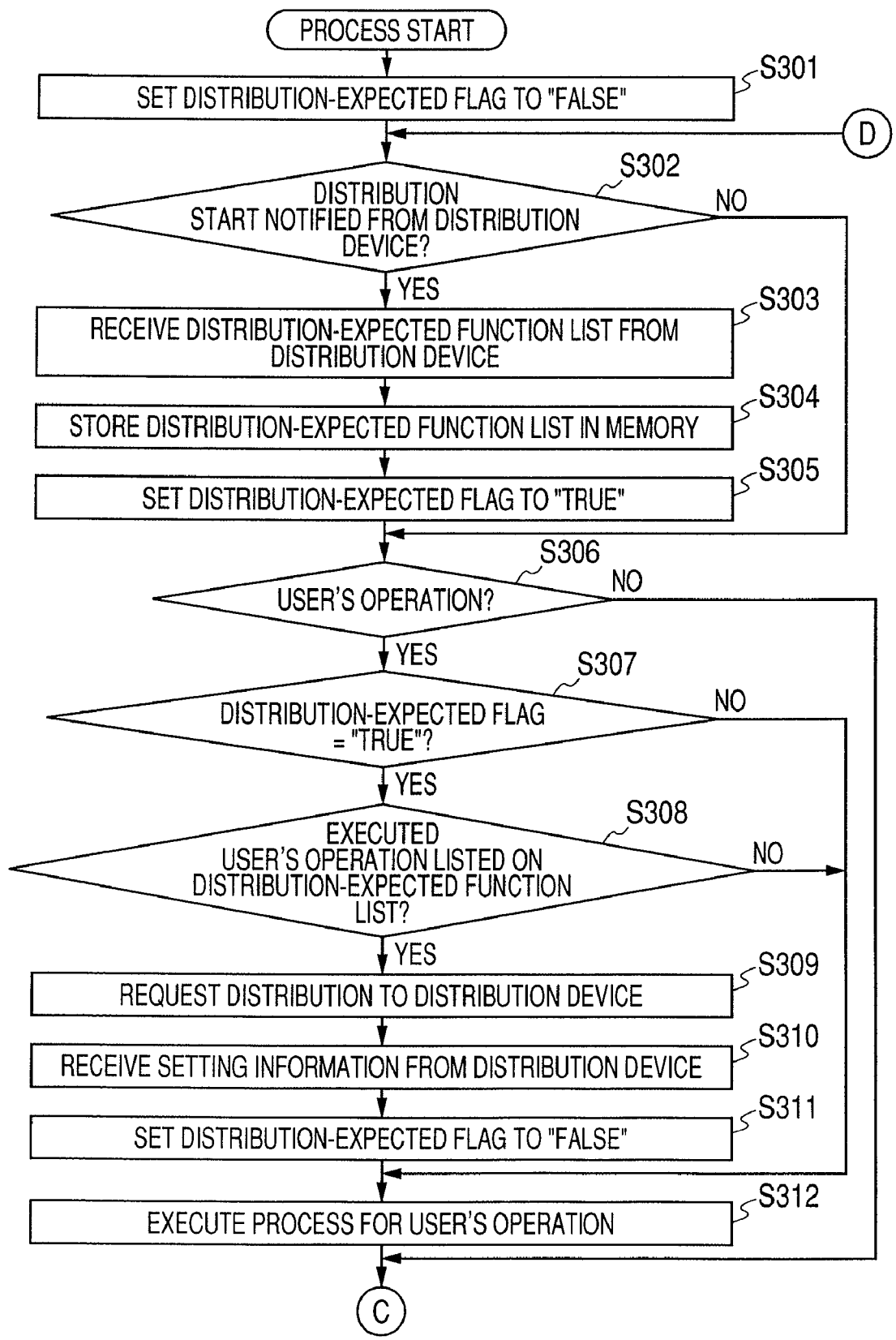
FIG. 14, which is composed of FIGS. 14A and 14B, is a flow chart illustrating a process flow to be executed by the reception-side printer, according to the third embodiment.
Figure 14B:
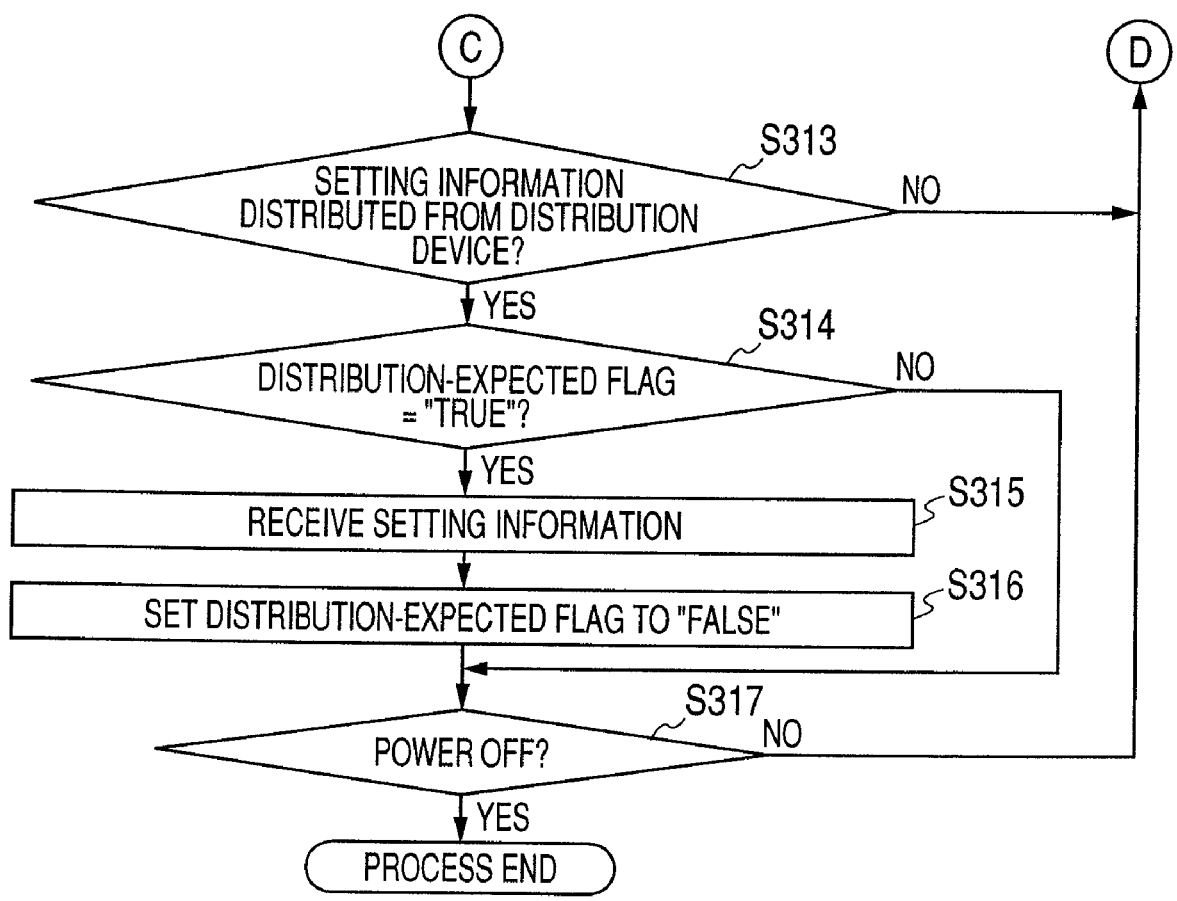

FIG. 14, which is composed of FIGS. 14A and 14B, is a flow chart illustrating a process flow to be executed by each of the reception-side printers 2 to 5, which receives the setting information, according to the third embodiment.

As well as the process in the flow chart illustrated in FIG. 9, the process in the flow chart illustrated in FIGS. 14A and 14B starts when the power of each of the printers 2 to 5 is turned on, and respective steps in the flow chart are executed on the premise that the CPU 1000 executes a control program stored in each of the printers 2 to 5.

In the present embodiment, only processes different from the flow chart illustrated in FIG. 9 will be described hereinafter.

If the CPU 1000 of each of the printers 2 to 5 receives the distribution start notification from the printer 1 in a step S302, the flow advances to a step S303. In the step S303, the CPU 1000 acquires the distribution-expected function list included in the received distribution start notification. Then, in a step S304, the CPU 1000 stores the acquired distribution-expected function list in the memory. Subsequently, in a step S305, the CPU 1000 writes "TRUE" in the distribution-expected flag.

If the CPU 1000 detects the user's operation in a step S306, the flow advances to a step S307 to determine whether or not the distribution-expected flag is "TRUE". Then, if it is determined that the distribution-expected flag is "TRUE", the flow further advances to a step S308.

In the step S308, the CPU 1000 determines whether or not the setting information relevant to the content of the operation input in the step S306 (that is, the content of the process to be executed) is included in the distribution-expected function list stored in the memory. If it is determined that the setting information relevant to the content of the operation input in the step S306 is included in the distribution-expected function list, the flow advances to a step S309. In the step S309, the CPU 1000 requests the printer 1 to distribute the setting information. On the other hand, if it is determined in the step S308 that the setting information relevant to the content of the operation input in the step S306 is not included in the distribution-expected function list, the CPU 1000 does not request the printer 1 to distribute the setting information. In this case, the flow advances to a step S312.

It should be noted that the subsequent processes are the same as those described in FIG. 9.

Incidentally, in FIGS. 14A and 14B, the whole of the setting information to be distributed is received in a step S310. However, in the step S310, only a part of the setting information may be received. Here, it should be noted that the part of the setting information indicates, from the whole setting information to be distributed, only the items of the setting information relevant to the content of the operation input in the step S306. In this case, the CPU 1000 extracts, from the setting information described in the distribution-expected function list, the setting information relevant to the content of the operation input in the step S306 (that is, the content of the process to be executed). Then, in the step S309, the CPU 1000 requests the printer 1 to distribute only the extracted setting information. In a case where a data amount of the whole setting information is large but a data amount of only the setting information relevant to the content of the operation is small, such a modification is more effective because a user's queuing time is shortened. However, a process in a step S311 is not executed in this case. In other words, after the part of the setting information was received in the step S310, it is set not to write "FALSE" in the distribution-expected flag. Thus, it is possible in a later step S315 to receive the remaining setting information not received in the step S310.

As described above, according to the present embodiment, the reception-side device can previously know the setting items of the setting information to be distributed in the future.

Moreover, in case of immediately acquiring the setting information, it is possible to receive, from the whole setting information to be distributed, only the setting information relevant to the process to be executed. By doing so, the user's queuing time for reception and setting of the setting information is shortened, whereby it is more convenient.

Fourth Embodiment

In the above-described first to third embodiments, when the reception-side device detects the user's operation, the relevant device automatically requests the distribution device to distribute the setting information. However, when the reception-side device detects the user's operation, a user may select whether or not to request the distribution device to distribute the setting information.

In the present embodiment, when the reception-side device detects the user's operation, the relevant device causes the user to select whether or not to request the distribution device to distribute the setting information.

In the following, the present embodiment will be described. Here, it should be noted that the system constitution in the present embodiment is the same as that in the first embodiment.

Figure 15A:
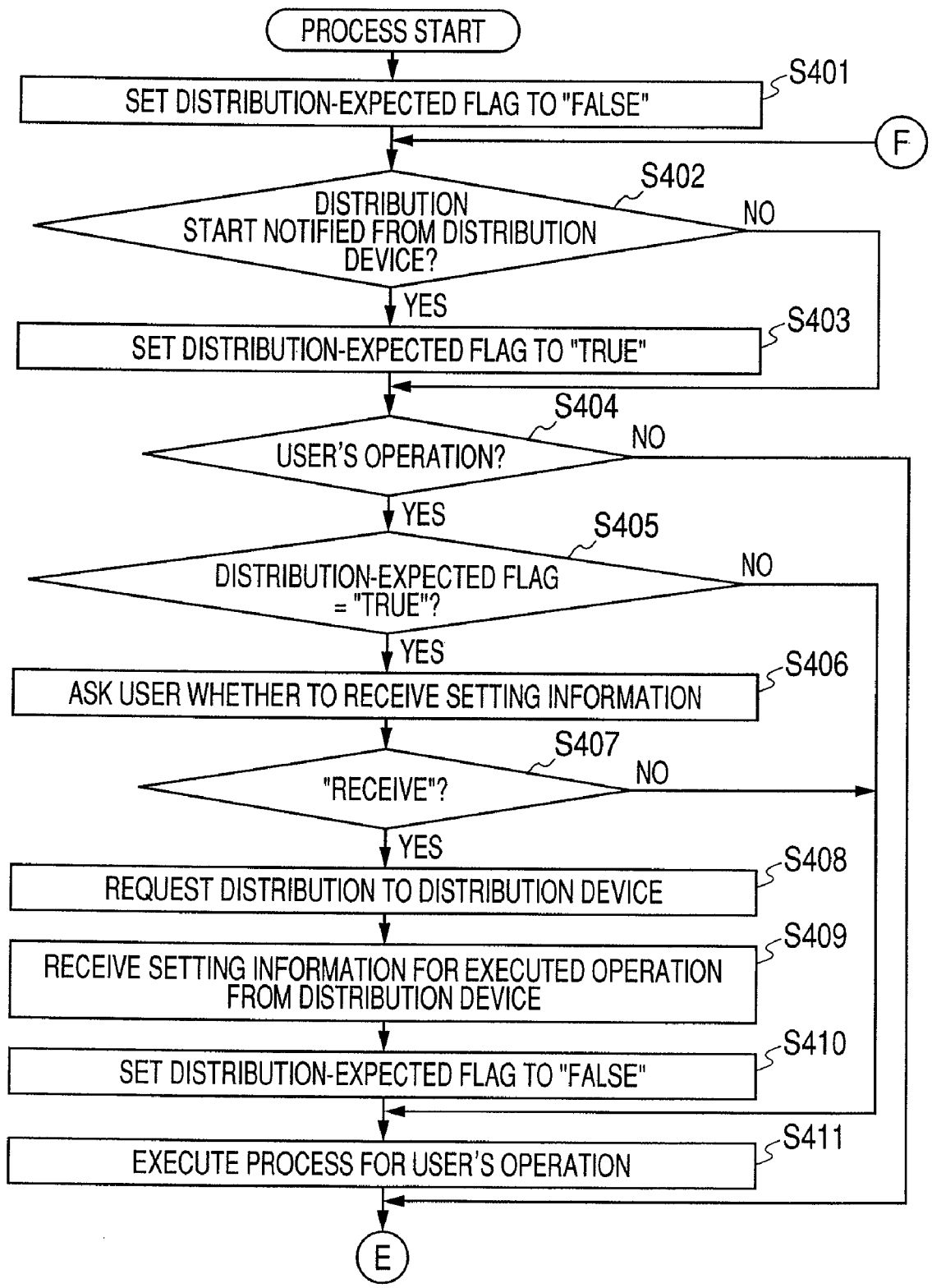
FIG. 15, which is composed of FIGS. 15A and 15B, is a flow chart illustrating a process flow to be executed by the reception-side printer, according to the fourth embodiment.
Figure 15B:
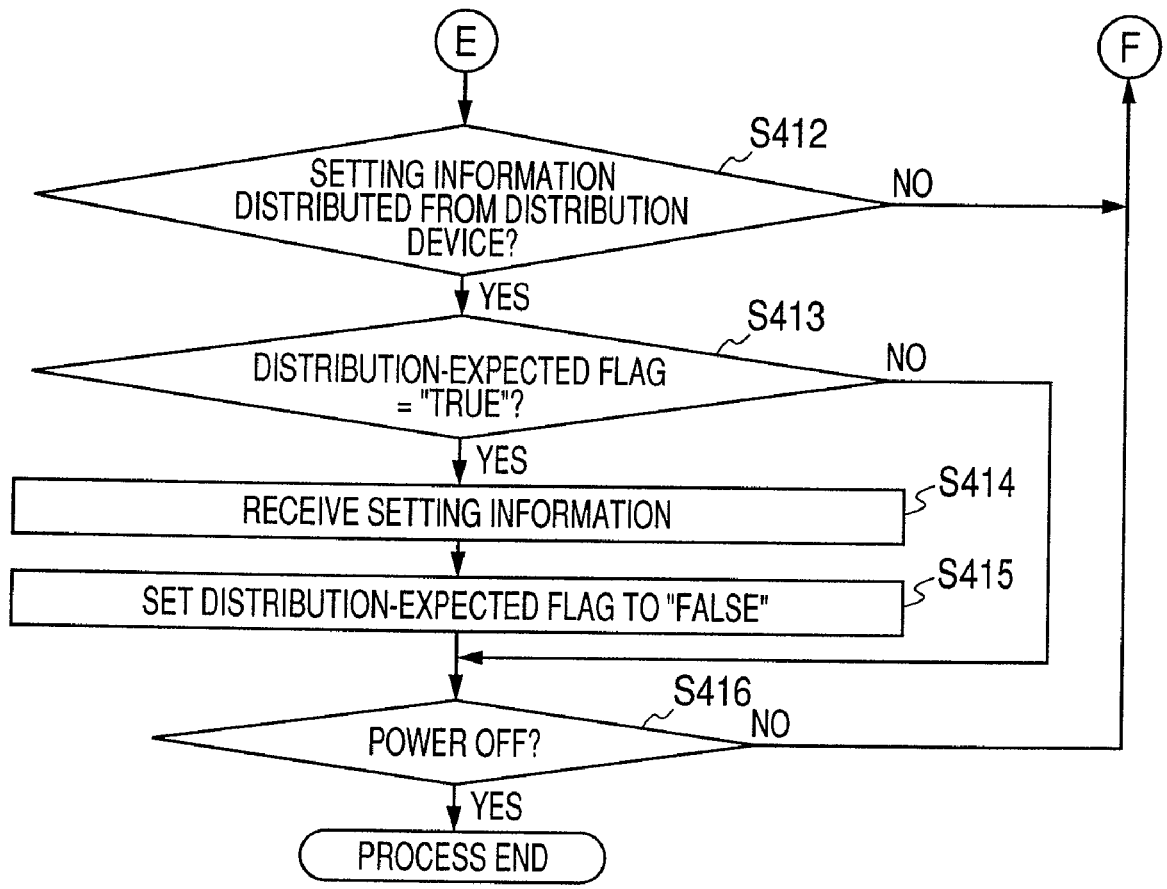

FIG. 15, which is composed of FIGS. 15A and 15B, is a flow chart illustrating a process flow to be executed by each of the reception-side printers 2 to 5, which receives the setting information, according to the present embodiment.

As well as the process in the flow chart illustrated in FIG. 9, the process in the flow chart illustrated in FIGS. 15A and 15B starts when the power of each of the printers 2 to 5 is turned on, and respective steps in the flow chart are executed on the premise that the CPU 1000 executes a control program stored in each of the printers 2 to 5.

In the present embodiment, only processes different from the flow chart illustrated in FIG. 9 will be described hereinafter. More specifically, the processes in steps S406, S407 and S408 are different from the flow chart illustrated in FIG. 9.

If the CPU 1000 of each of the printers 2 to 5 detects a user's operation in a step S404, the flow advances to a step S405 to determine whether or not the distribution-expected flag is "TRUE". Then, if it is determined that the distribution-expected flag is "TRUE", the flow advances to the step S406.

Figure 16:
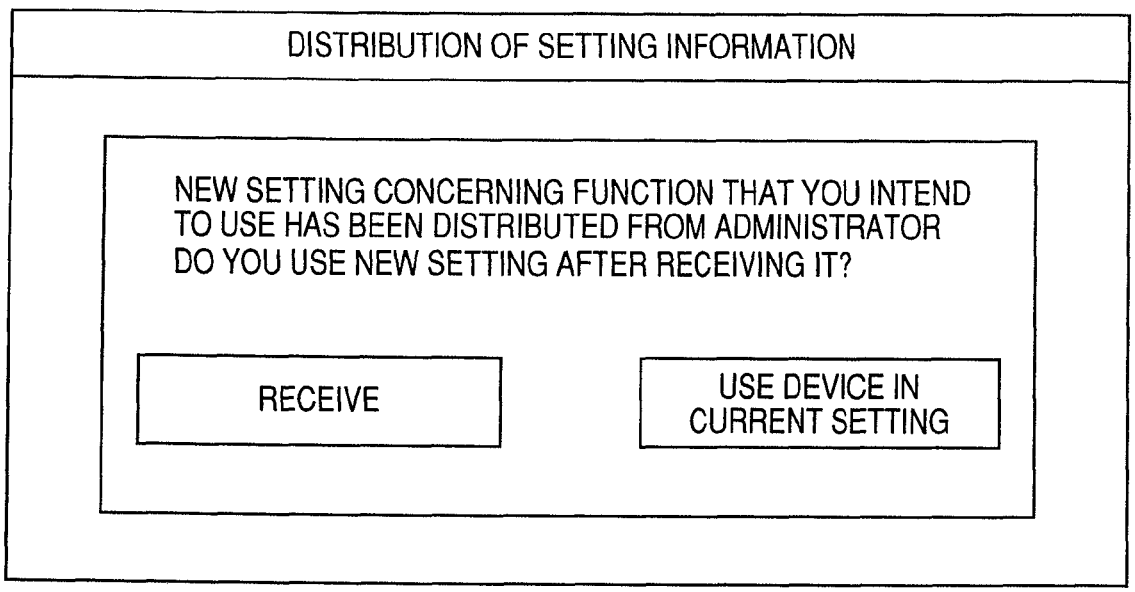
FIG. 16 is a diagram illustrating an example of a screen to be displayed on the operation unit of the reception-side printer.

In the step S406, the CPU 1000 causes the operation unit to display a screen for inquiring of the user whether or not to request the printer 1 to distribute the setting information. FIG. 16 illustrates an example of the screen displayed on the operation unit in the step S406. More specifically, on the relevant screen, the information indicating that own device is in a state of waiting for the setting information distributed from the distribution device is displayed. Moreover, a "receive" button which is used by the user to instruct to request the printer 1 to distribute the setting information and a "use device in current setting" button which is used by the user to instruct not to request the printer 1 to distribute the setting information are displayed respectively. Then, if the "receive" button is selected by the user, the CPU 1000 requests the printer 1 to distribute the setting information. On the other hand, if the "use device in current setting" button is selected by the user, the CPU 1000 does not request the printer 1 to distribute the setting information. In latter case, the CPU 1000 executes a process according to the operation content instructed by the user in the step S404.

In the step S407, the CPU 1000 determines whether or not the distribution device is instructed by the user to distribute the setting information. More specifically, it is determined on the screen of FIG. 16 displayed in the step S406 whether or not the "receive" button is selected by the user. If it is determined in the step S407 that the "receive" button is selected by the user, the flow advances to the step S408. On the other hand, if it is determined in the step S407 that the "use device in current setting" button is selected by the user, the flow advances to a step S411.

In the step S408, the CPU 1000 requests the printer 1, acting as the distribution device, to distribute the setting information. Then, in a step S409, the setting information distributed from the printer 1 acting as the distribution device is received, and the received setting information is registered as the setting information of own device. Incidentally, in the step S408, the CPU 1000 does not need to request the printer 1 to distribute the whole setting information that the printer 1 intends to distribute. Namely, the CPU 1000 may request the printer 1 to distribute only the setting information relative to the process based on the content of the user's operation. In this case, in the step S408, the CPU 1000 does not merely request the printer 1 to distribute the setting information, but specifies, from the content of the user's operation detected in the step S404, the process to be executed and transmits the content of the specified process to the printer 1. Then, the printer 1 extracts, from the setting information to be distributed, the setting information relevant to the content of the relevant process, and actually distributes the extracted setting information. Moreover, as described in the third embodiment, in the case where the distribution-expected function list has already been distributed, the reception-side device may determine the items of the setting information that the relevant device itself requests the printer 1 to distribute.

It should be noted that the processes in a step S410 and subsequent steps are the same as the corresponding processes in the flow chart described in FIG. 9.

Figure 17:
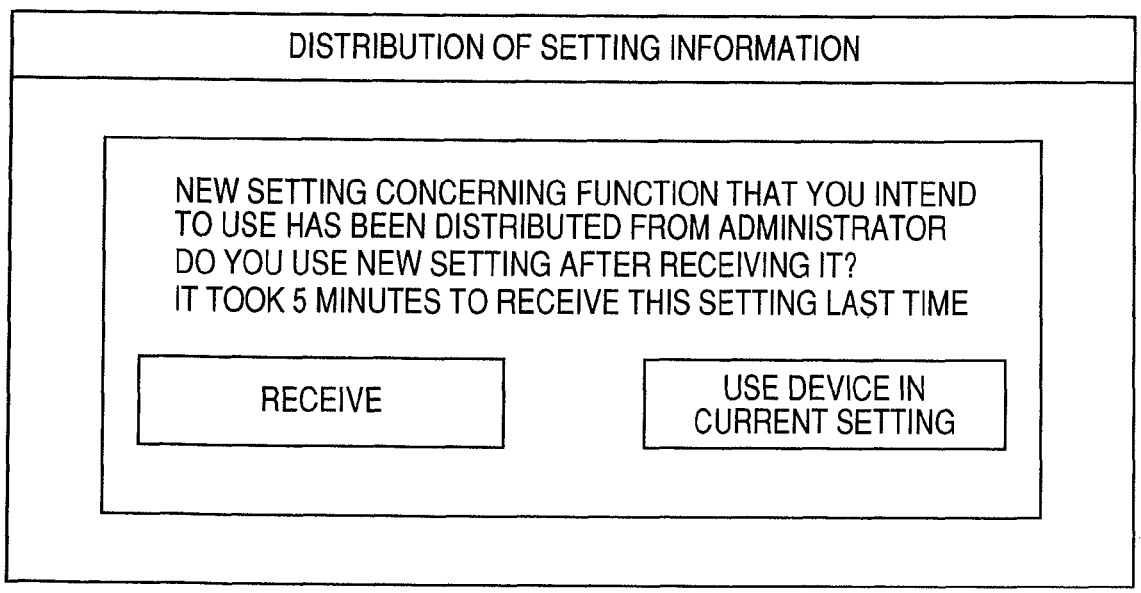
FIG. 17 is a diagram illustrating an example of a screen to be displayed on the operation unit of the reception-side printer.

FIG. 17 is a diagram illustrating another example of the screen to be displayed in the step S406, on the operation unit of the reception-side device. Here, it should be noted that the screen illustrated in FIG. 17 is different from the screen illustrated in FIG. 16 in the point that a time (duration) which is taken to receive the setting information is displayed thereon. To display the screen illustrated in FIG. 17, the reception-side device held (or stored) the time taken to receive and set the setting information when it previously received the setting information. Then, in case of displaying the screen illustrated in FIG. 17, the reception-side device generates the relevant screen based on the held information. Alternatively, before the process in the step S406, the reception-side device may inquire of the printer 1, acting as the distribution device, how long it takes a time to distribute the setting information. In addition, when distributing the same setting information to another reception-side device, the printer 1 may hold or store time information indicating how long it took a time to distribute the setting information, and then respond to the inquiry based on the held information. In this case, accordingly, the screen illustrated in FIG. 17 may be generated based on the time information transmitted from the printer 1.

As just described, in the present embodiment, when the reception-side device detects the user's operation, it is possible for the reception-side device to cause the user to select whether or not to request the distribution device to distribute the setting information. There is a possibility that, according to a data amount of the setting information, it takes a time to receive and set the setting information on the reception-side device. In such a circumstance, it is possible, by causing the user to select whether or not to request distribution of the setting information, to meet a request by a user who prioritizes a time, that is, a user who wishes to immediately execute the process rather than update the setting information. Moreover, if a time taken to receive and set the setting information is displayed on the screen for causing the user to select whether or not to request distribution of the setting information, the user can know how long he/she has to wait for the distributed setting information, whereby it is more convenient.

Fifth Embodiment

In the above-described fourth embodiment, when the reception-side device detects the user's operation, the relevant device causes the user to select whether or not to request the distribution device to distribute the setting information. Here, it should be noted that the reception-side device may receive the setting information for the detected user's operation, compare the previous setting before reception of the setting information for the detected user's operation with the new setting after reception of the relevant setting information, and then cause the user to select which of the settings should be used only in a case where it is detected as a result of such comparison that the previous setting has been changed to the new setting.

In the following, the present embodiment will be described. Here, it should be noted that the system constitution in the present embodiment is the same as that in the first embodiment.

Figure 18B:
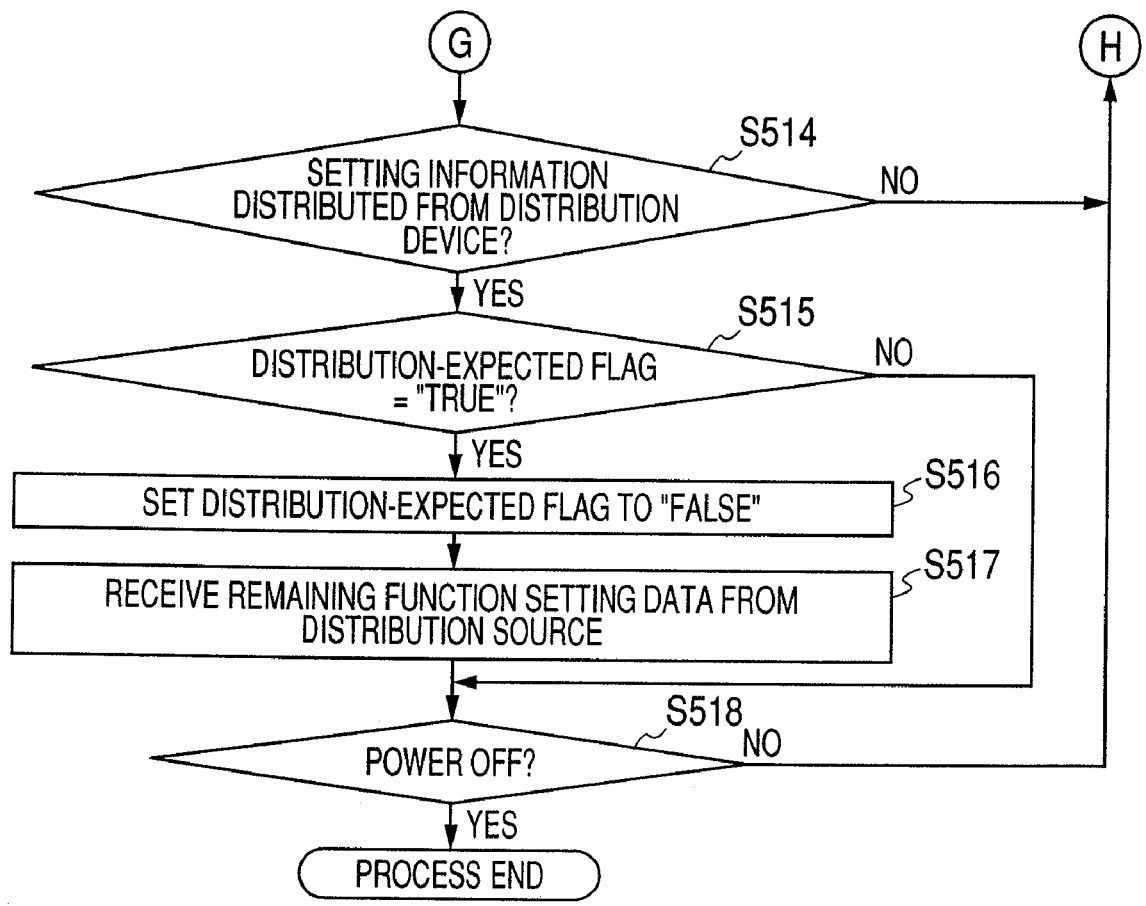
FIG. 18, which is composed of FIGS. 18A and 18B, is a flow chart illustrating a process flow to be executed by the reception-side printer, according to the fifth embodiment.

FIG. 18, which is composed of FIGS. 18A and 18B, is a flow chart illustrating a process flow to be executed by each of the reception-side printers 2 to 5, which receives the setting information, according to the present embodiment.

As well as the process in the flow chart illustrated in FIG. 9, the process in the flow chart illustrated in FIGS. 18A and 18B starts when the power of each of the printers 2 to 5 is turned on, and respective steps in the flow chart are executed on the premise that the CPU 1000 executes a control program stored in each of the printers 2 to 5.

In the present embodiment, only processes different from the flow chart illustrated in FIG. 9 will be described hereinafter. More specifically, the processes in steps S506, S507, S508, S509, S510, S511, S512 and S513 are different from the flow chart illustrated in FIG. 9.

More specifically, if the CPU 1000 of each of the printers 2 to 5 detects a user's operation in a step S504, the flow advances to a step S505 to determine whether or not the distribution-expected flag is "TRUE". Then, if it is determined that the distribution-expected flag is "TRUE", the flow advances to the step S506.

In the step S506, the CPU 1000 notifies the printer 1, acting as the distribution device, of the content of the process to be executed based on the user's operation in the step S504. Then, in the step S507, the CPU 1000 receives the setting information relevant to the process to be executed, from the printer 1 through the network I/F 1004. Subsequently, in the step S508, the CPU 1000 sets the distribution-expected flag to "FALSE".

In the step S509, the received setting information is compared with the setting information which has been previously set in own device in regard to the item corresponding to the received setting information. In other words, it is determined whether or not the received setting information is different from the previously set setting information.

Then, if it is determined that the received setting information is different from the previously set setting information, the flow advances to the step S510 to display a screen for inquiring of the user whether or not to execute the process based on the new setting information received in the step S507. On the other hand, if it is determined that the received setting information is the same as the previously set setting information, the flow advances to the step S513 to execute the process based on the already-set setting information.

Figure 19:
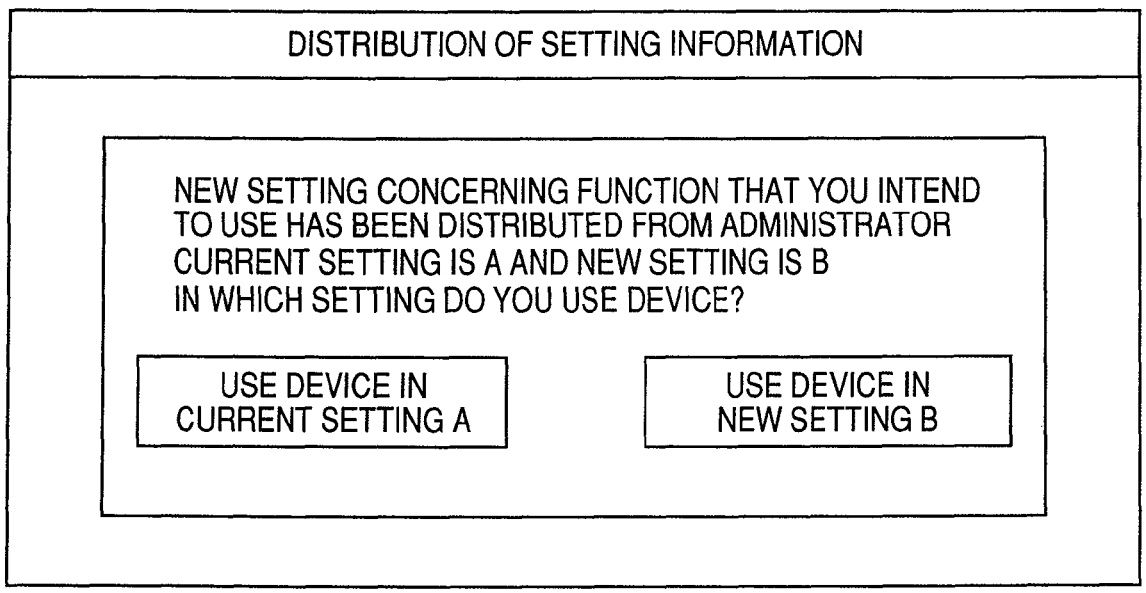
FIG. 19 is a diagram illustrating an example of a screen to be displayed on the operation unit of the reception-side printer.

FIG. 19 is a diagram illustrating an example of the screen to be displayed in the step S510, on the operation unit of the reception-side device. Here, information which indicates that the received setting information is different from the setting information already set in own device (described as "current setting" in FIG. 19) is displayed on the relevant screen. In the example illustrated in FIG. 19, the content of the already-set setting information is specified as "current setting A", and the content of the newly received setting information is specified as "new setting B". Moreover, in the relevant example, a "use device in current setting A" button and a "use device in new setting B" button are displayed on the screen. More specifically, the "use device in current setting A" button is selected by the user to instruct the device to execute the process based on the already-set setting information without updating the already-set setting information by the newly received setting information. On the other hand, the "use device in new setting B" button is selected by the user to instruct the device to execute the process based on the newly received setting information.

In the step S511, the CPU 1000 determines whether or not the user selects the new setting. More specifically, the CPU 1000 determines which of the buttons displayed on the screen illustrated in FIG. 19 is selected. Here, if the "use device in current setting A" button is selected, the flow advances to the step S513. On the other hand, if the "use device in new setting B" button is selected, the flow advances to the step S512.

In the step S512, the CPU 1000 sets the setting information, received in the step S507, as the setting information of own device, and actually executes the process based on the relevant setting information. On the other hand, in the step S513, the CPU 1000 executes the process based on the already-set (current) setting information without setting the setting information, received in the step S507, as the setting information of own device. After then, the CPU 1000 sets the setting information, received in the step S507, as the setting information of own device.

It should be noted that the processes in a step S514 and subsequent steps are the same as the corresponding processes in the flow chart described in FIG. 9.

As described above, according to the present embodiment, in the case where the previously set setting information is changed by the setting information newly distributed from the distribution device, the user can select which of the previously set setting information and the newly distributed setting information should be used to execute the process.

Other Embodiments

Figure 20:
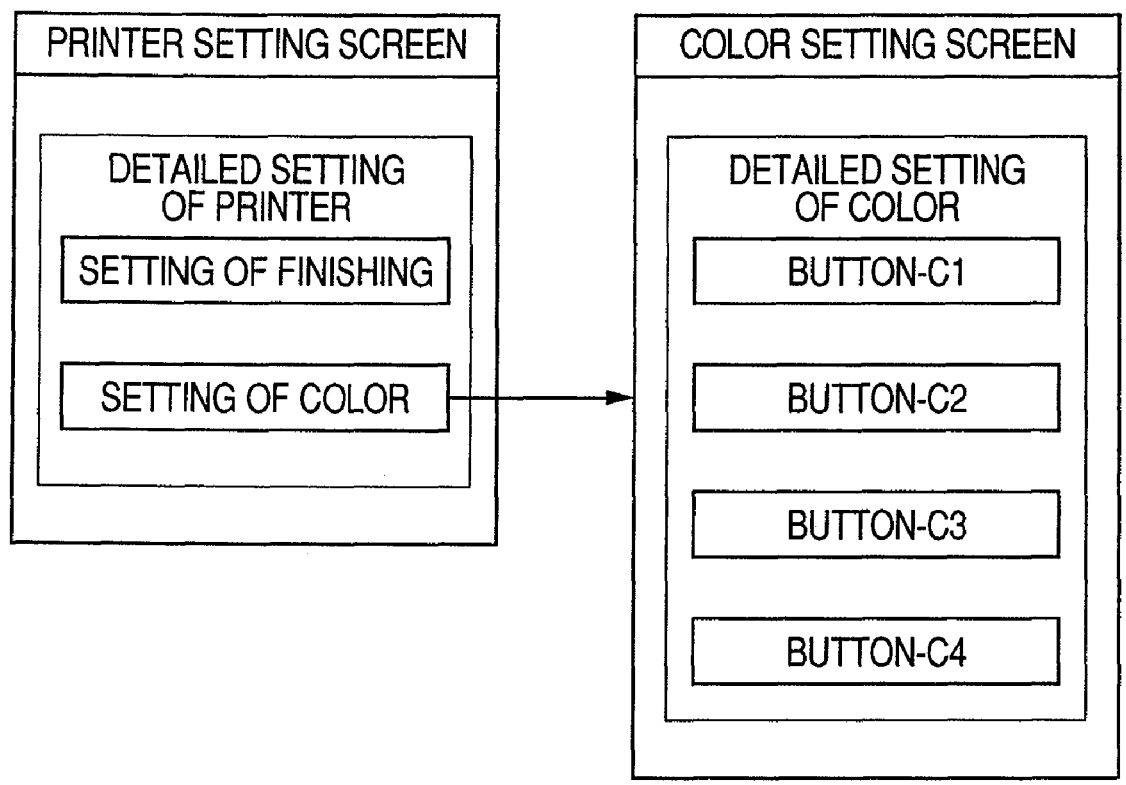
FIG. 20 is a diagram illustrating an example of a user interface of the printer.

FIG. 20 is a diagram illustrating an example of a user interface of each of the printers 2 to 5 according to the first to fifth embodiments. More specifically, FIG. 20 implies that, if a "setting of color" button on a printer setting screen which is a user interface is selected, a color setting screen which is another user interface is opened. In this case, a user's operation started by selecting a "button-C2" on the color setting screen may be detected by such selection of the "button-C2" on the color setting screen. Further, the user's operation may be detected based on inference that, for example, there is a possibility that, since an adjacent "button-C1" is selected, the "button-C2" will be next selected. Furthermore, the user's operation may be detected based on inference that there is a possibility that, when the "setting of color" button on the printer setting screen is selected, a lower-hierarchical "button-C3" will be next selected. More generally, in a multifunction device which is equipped with a printer or a printer output function which includes a hierarchized operation mechanism, a start of lower-hierarchical operation may be detected based on an operation of higher-hierarchical operation. Besides, the user interface may be either the operation unit provided in the main body of the image processing device such as each of the printers 2 to 5 or a user interface provided on a separate information processing device such as a personal computer or the like or remotely providing the relevant operation function. Furthermore, it is also effective to use a sensor instead of the higher-hierarchical operation. For example, as operation start detection means of which hierarchy is higher than the uppermost hierarchy of the operation panel, a sensor for detecting a person standing in front of each of the printers 2 to 5 may be used. In this case, when the person standing in front of the printer is detected, the sensor may detect that a user's operation is started.

Moreover, the present invention may be applied to a system which includes plural devices, or to an equipment which includes a single device.

Incidentally, the present invention can be achieved in a case where a storage medium storing program codes of software to realize the functions of the above embodiments is supplied to a system or a device and then a computer (or CPU or MPU) in the system or the device reads and executes the program codes stored in the storage medium.

In this case, the program codes themselves read from the storage medium realize the functions of the above embodiments, whereby the storage medium storing these program codes constitutes the present invention.

As the storage medium for supplying the program codes, for example, a floppy disk, a hard disk, an optical disk, a magnetooptical disk, a CR-ROM, a CD-R, a DVD-ROM, a magnetic tape, a nonvolatile memory card, a ROM, or the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-339861, filed Dec. 18, 2006, which is hereby incorporated by reference herein in its entirety.

What is claimed is:

1. An image processing device which can communicate with a distribution device distributing setting information to plural image processing devices, comprising:
    a first reception unit constructed to receive, from the distribution device, start information indicating that the distribution device starts distributing the setting information to the plural image processing devices including said image processing device; and
    a control unit constructed to, in a case where it is instructed by a user to execute a process after the start information was received by the reception unit and before the setting information is received, obtain the setting information from the distribution device by requesting the distribution device to distribute the setting information, set the obtained setting information as the setting information of the image processing device, and then execute the instructed process, and to, in a case where it is not instructed by the user to execute a process after the start information was received by the reception unit and before the setting information is received, receive the setting information transmitted from the distribution device without requesting the distribution device to distribute the setting information, and set the received setting information as the setting information of the image processing device.

2. An image processing device according to claim 1, further comprising:
    a notification unit constructed to notify the distribution device of the process executed in said image processing device; and
    a second reception unit constructed to receive, from the distribution device, information indicating whether or not the setting information distributed by the distribution device is related to the process executed in said image processing device, wherein said control unit transmits the request to the distribution device in a case where the setting information distributed by the distribution device is related to the process executed in said image processing device.

3. An image processing device according to claim 2, wherein said control unit transmits the request to the distribution device which is related to the process executed in said image processing device, from among the setting information distributed by the distribution device, and does not transmit the request to the distribution device which is not related to the process executed in said image processing device.

4. An image processing device according to claim 1, wherein the start information received by the first reception unit includes item of the setting information distributed by the distribution device, said image processing device further comprises a determination unit constructed to determine whether or not the setting information distributed by the distribution device is related to the process executed in said image processing device, and in a case where it is determined that the setting information distributed by the distribution device is related to the process executed in said image processing device, the control unit transmits the request to the distribution device.

5. An image processing device according to claim 1, further comprising:

an inquiry unit constructed to inquire of the user whether or not to transmit the request, by said control unit, to the distribution device, wherein, in a case where it is selected by the user to transmit the request said control unit transmits the request to the distribution device.

6. An image processing device according to claim 1, wherein the setting information includes any one of a user mode, a network setting, a section ID and a destination table registered in said image processing device.

7. A control method for an image processing device which can communicate with a distribution device distributing setting information to plural image processing devices, the control method comprising the steps of:

a reception step of receiving, from the distribution device, start information indicating that the distribution device starts distributing the setting information to the plural image processing devices including said image processing device; and a control step of, in a case where it is instructed by a user to execute a process after the start information was received by the reception step and before the setting information is received, obtaining the setting information from the distribution device by requesting the distribution device to distribute the setting information, setting the obtained setting information as the setting information of the image processing device, and then executing the instructed process, and to, in a case where it is not instructed by the user to execute a process after the start information was received by the reception step and before the setting information is received, receiving the setting information transmitted from the distribution device without requesting the distribution device to distribute the setting information, and setting the received setting information as the setting information of the image processing device.

* * * * *